United States Patent
Magierowski et al.

(10) Patent No.: US 9,992,045 B2
(45) Date of Patent: Jun. 5, 2018

(54) ON-LINE SIGNAL EVENT DETECTION AND IDENTIFICATION METHOD AND APPARATUS

(71) Applicants: Sebastian Magierowski, Toronto (CA); Yiyun Huang, Shanghai (CN)

(72) Inventors: Sebastian Magierowski, Toronto (CA); Yiyun Huang, Shanghai (CN)

(73) Assignees: Sebastian Magierowski, Toronto, Ontario (CA); Yiyun Huang, Toronto, Ontario (CA)

(*) Notice: Subject to any disclaimer, the term of this patent is extended or adjusted under 35 U.S.C. 154(b) by 0 days. days.

(21) Appl. No.: 15/236,481

(22) Filed: Aug. 15, 2016

(65) Prior Publication Data
US 2018/0048495 A1 Feb. 15, 2018

Related U.S. Application Data

(60) Provisional application No. 62/204,441, filed on Aug. 13, 2015.

(51) Int. Cl.
*H04L 25/03* (2006.01)
(52) U.S. Cl.
CPC .............................. *H04L 25/03834* (2013.01)
(58) Field of Classification Search
CPC . G05B 21/02; G06F 1/02; G06F 17/13; G06F 17/15; G06F 17/18; G06G 7/00; G06G 7/02; G06T 7/00; H04B 1/04; H04L 1/20; H04L 1/205; H04L 25/03834

USPC .................. 375/219, 230, 296, 316; 700/73; 702/179; 708/271, 420, 443, 801, 819
See application file for complete search history.

(56) References Cited

U.S. PATENT DOCUMENTS

| | | | |
|---|---|---|---|
| 2008/0039960 A1* | 2/2008 | Kadir ...................... | G06F 17/18 700/73 |
| 2009/0094302 A1* | 4/2009 | Hollis .................. | G06F 17/5009 708/271 |
| 2009/0259709 A1* | 10/2009 | Nikitin ..................... | G06G 7/02 708/801 |
| 2013/0287136 A1* | 10/2013 | Martinez Nuevo .. | H04B 1/0475 375/285 |
| 2016/0036568 A1* | 2/2016 | Guenther ................ | H04L 1/205 375/226 |

\* cited by examiner

*Primary Examiner* — Shawkat M Ali
(74) *Attorney, Agent, or Firm* — Norton Rose Fulbright Canada LLP; Maya Medeiros

(57) ABSTRACT

A method of and apparatus for on-line detection and identification of synchronous and asynchronous piecewise-constant signals corrupted by noise and distortion. The method achieves joint temporal and amplitude detection and identification by following an initial amplitude approximation with a change detection that continually converges to an accurate joint identification while continually correcting intermediate approximation errors via analysis of temporal signatures. In turn, the temporal identifications employ accumulated statistics partly determined by the initial amplitude approximation.

10 Claims, 8 Drawing Sheets

ON-LINE SIGNAL EVENT DETECTION AND IDENTIFICATION METHOD AND APPARATUS

CROSS-REFERENCE TO RELATED APPLICATIONS

This application claims the benefit of provisional patent application Ser. No. 60/204,441, filed 2015 Aug. 13 by the present inventors.

BACKGROUND

Prior Art

The following is a tabulation of some prior art that presently appears relevant:

Nonpatent Literature Documents

C. Plesa, C. Dekker, "Data analysis methods for solid-state nanopores," *Nanotechnology*, 26 (2015).
E. S. Page, "Continuous inspection schemes," *Biometrika*, 41 (1954), pp. 100-115.
C. Raillon, P. Granjon, M. Graf, L. J. Steinbock, A. Radenovic, "Fast and automatic processing of multi-level events in nanopore translocation experiments", *Nanoscale*, 4 (2012), pp. 4916-4924.
D. O. North, "An analysis of the factors which determine signal/noise discrimination in pulsed-carrier systems," *Proc. of the IEEE*, 51 (1963), pp. 1016-1027.

Many human-made signals and many naturally occurring signals assume a form that can be described as a piecewise-constant signal as a function of time, t. A sketch of such a signal, or at least a signal v(t) that is analogous to the original signal, with its sequence of discrete levels, is shown in FIG. 1. The signal is described as comprising of an integer number, L, of discrete levels at values $v_1, v_2, \ldots, v_L$. The discrete set of levels associated with the signal may be an original property of the signal or may be intentionally attributed to the original signal. That is, a signal with a continuity of piecewise-constant levels may be artificially interpreted as consisting of levels attributable to a discrete set of values. Conceptually the discrete levels could represent any of a large variety of physical phenomena or human-defined attributes varying over time. Examples of these type of phenomena not intended to be limiting include those employed for the purpose of digital communication such as pulse amplitude modulation (as discussed in the text *Digital Communications* by J. Proakis 5th ed. (2007) McGraw-Hill), particle detection and identification as in the translocation of DNA/RNA molecules through a Coulter-counter-like device (e.g. a solid-state or a protein-based nanopore as reviewed in works such as "Nanopore sensors for nucleic acid analysis" B. M. Venkatesan and R. Bashir, *Nat. Nanotech.*, 6 (2011), pp. 615-624) signals gathered through atomic force microscopy (as described in "Detection and localization of individual antibody-antigen recognition events by atomic force microscopy" P. Hinterdorfer and W. Baumgartner and H. J. Gruber and K. Schilcher and H. Schindler, *Proc. Natl. Acad. Sci.*, 93 (1993), pp. 3477-3481) or interferometry (as described in "Direct observation of kinesin stepping by optical trapping interferometry" K. Svoboda and C. F. Schmidt and B. J. Schnapp and S. M. Block, *Nature*, 365 (1993), pp. 721-727). piecewise-constant signals encompass many other applications related to instrumentation as well as environmental, industrial and human-made monitoring including such applications as temperature monitoring, pressure monitoring, fuel consumption, surveillance for discrete-events, fire alarm systems, smoke detectors, motion detectors, fraud detection, quality detection, financial market fluctuations, etc. (the text *Adaptive Filtering and Change Detection* by F. Gustafsson (2000), John Wiley & Sons, Ltd. details some of the applications of this type).

As illustrated in FIG. 2 the originating physical representation of the signal (e.g. electromagnetic, photonic, thermal, mechanical, pressure, electronic, molecular, ionic, statistical, behavioural, etc.) can be converted, by an appropriate transducer [1] (e.g. antenna, Coulter counter, nanopore, photodiode, piezoresistor, thermocouple, magnetic sensor, ion sensor, gas sensor, particle sensor, etc.), to an "analogous signal", in other words an analog signal [2] v(t) that may, without limiting the disclosure, take on the form of an electronic voltage, electronic current, photonic emission, etc. Under ideal transduction this signal can be considered to take the form shown in FIG. 1 where the discrete levels $v_1, v_2, \ldots, v_L$ correspond to some voltage or current setting.

More generally the Applicants will refer to the discrete levels $v_1, v_2, \ldots, v_L$ of the analog signal [2] as "event levels". The Applicants also generally refer to the instance at which the signal transitions from one event level to a different event level as the "event time". In FIG. 1 the event times are labelled with the variable where the variable, i, stands for some integer that is used by the Applicants throughout this disclosure to identify each event time and hence each "event". The Applicants use the term "event" to denote any one constant level feature within a piecewise-constant signal. In general, the period of time between $n_{c,i}$ and $n_{c,i+1}-1$ denotes the temporal duration of the ith event and is referred to by the Applicants as the "event duration". In general an event, i, can take on any of the L event levels illustrated in FIG. 1. In other words, the transition from one event to a following event in time is random with some statistical distribution across the L possible event levels and possibly a statistical distribution in the temporal duration (i.e. event duration) of any event.

The speed of the analog signal [2] is inversely related to the minimum event duration. The lower the minimum event duration of the analog signal [2], the higher the effective speed of the analog signal [2]. In general the higher the signal speed the more complexity that is required of any signal processing systems following the transducer [1].

As illustrated in FIG. 3, in practice, the analog signal [2] produced by the transducer [1] will be corrupted by noise and distortion caused by the environment from which the signal is gathered as well as from the non-idealities of the transducer [1] itself. As a result, a means of mitigating the added noise and distortion is needed that recovers the original signal as accurately as possible.

In general, the transducer may be followed by a detector [3] as shown in FIG. 4. The detector [3] is a signal processing system capable of detecting the presence of and identifying the properties of "underlying events" possessed by the analog signal [2]. Each of these underlying events possess properties such as event level and event time of the analog signal [2] v(t) uncorrupted by noise or distortion. An illustrative example of the uncorrupted analog signal [2] is provided in FIG. 1. The Applicants also refer to the underlying events as "baseline events" which, in turn, may be referred to as consisting of baseline event levels and baseline event times.

The detector [3] block, as considered in this disclosure, is an element capable of extracting the underlying signal or equivalently the baseline signal in the sense that it possesses the ability to recognize that a change in a signal has occurred (i.e. to "detect" that a change indicative of some event has occurred) and also the ability of identifying (sometimes referred to as "estimating") when that change occurred (i.e. identifying the event time) and also identifying what value that change bestowed on the signal (i.e. identifying the event level). Without limiting the embodiment, in a modern realization, the detector [3] may be implemented using an integrated semiconductor technology. One such instantiation could be achieved using complementary metal-oxide-semiconductor (CMOS) technology. Other means could include optical components or molecular signal processing components.

In a number of practical scenarios not meant to be limiting, the detector [3] is preceded by signal conditioning circuitry which may amplify, filter, and potentially digitize the transducer [1] output signal before providing it to [3]. Alternate embodiments of the detector [3] may entirely forego any conditioning system between [3] and [1].

An example of a front-end signal conditioning "chain" or front-end chain [4] is illustrated in FIG. 5. This example, which is not meant to be limiting, partitions the front-end chain into three main components, the front-end analog amplifier: FEA [5], the front-end filter: FEF [6], and the analog-to-digital converter: ADC [7]. In alternate embodiments, other configurations internal to the front-end chain [4] are possible including arrangements without the FEA [5] and/or without the FEF [6] or with multiple FEF [6] and/or without the ADC [7].

In the example of the front-end chain shown in FIG. 5, the FEA [5] boosts the signal level to values that help marginalize the noise contributions from ensuing elements and enable adequate sampling quality before the detector [3]. In general more than one FEA [5] stage may be necessary. The FEF [6] filters the amplified signal from the FEA [5]. As part of this effort the FEF [6] may remove spectral components from the FEA [5] output signal associated with only noise outside the frequency band of interest. At the very least such filtering helps reduce signal degradation due to excess noise and aliasing arising from ensuing sampling. Finally the ADC [7] samples and quantizes the signal from the previous front-end components and presents a digitized detector input [8], $x_k$. Where $x_k$ is short-hand for x[k] a discrete-time, discrete-amplitude time-series with integer time index value, k. The main function of the detector [3] is to then produce a digitized detector output [9], $y_{k-D}$, which is short-hand for y[k–D] a discrete-time, discrete-amplitude time-series with integer time index value, k, with a potential delay index, D, relative to the corresponding detector input [8] presented to the detector [3] at time k. An illustration of a delayed version, $x_{k-D}$, of the noisy and distorted discrete-time input detector input [8], $x_k$, compared to the detector output [9], $y_{k-D}$, is shown in FIG. 6.

Despite the overall necessity and benefits of a front-end chain [4] this component typically degrades the signal quality further, adding noise and introducing more distortion atop that incurred from the transducer [1]. Although sophisticated design efforts (e.g. in CMOS) can be made to address such deficiencies in the front-end chain [4] they come at the expense of increased complexity, cost, power consumption and reliability. These complexity, cost, power, and reliability penalties are magnified as the speed of the analog signal [2] increases. More desirable than including a high-quality front-end chain [4] is the realization of a detector [3] element capable of producing a detector output [9], $y_{k-D}$, that matches the ideal analog signal [2] from the transducer [1] with great accuracy while dealing with a low-quality and hence inexpensive front-end chain [4]. This is generally the case because a substantial share of the front-end chain [4] comprises of analog components which generally have poor power-consumption/performance tradeoffs and higher part-to-part variability relative to a digital implementation as possible of the detector [3] preceded by an ADC [7].

Examples of the front-end chain [4] deficiencies that could be accommodated if a superior detector [3] were to be realized include: a low-power FEA [5] with increased noise contribution, lower bandwidth, and higher distortion; a low-order FEF [6]; a low-resolution ADC [7]. The ability to achieve adequate detector output [9] accuracy under such front-end chain [4] performance circumstances will greatly enhance a detection and identification system's affordability and scalability such that multiple signal channels may be processed.

A number of detection methods have been developed to convert a noisy piecewise-constant time-series detector input [8] $x_k$ into a high quality detector output [9] approximation $y_{k-D}$ of the baseline signal [2]. The quality of the detector [3] approximation depends on the specific needs of its application and the measure used to asses performance. One possible measure, as equivalently described in "A fast algorithm for computing longest common subsequences" by J. W. Hunt and T. G. Szymanski in *Commun. ACM*, 20 (1977), pp. 350-353, of the detector output [9] signal quality is the level-error-rate (LER) which is defined as $$\text{LER} = \frac{\text{total number of incorrect events in approximated sequence, } y_{k-D}}{\text{total number of events in baseline sequence}} \quad (1)$$

Another possible measure of the detector output [9] signal quality is the transition-error-rate (TER) which is defined as $$\text{TER} = \frac{\text{total number of incorrect samples in approximated sequence, } y_{k-D}}{\text{total number of events in baseline sequence}} \cdot \frac{1}{R} \quad (2)$$

where R is the number of samples gathered by the ADC [7] for the event in the sequence with the minimum event duration. The Applicants generally refer to R in this disclosure as the oversample rate.

Detection and identification methods can be broadly partitioned into two groups: off-line methods and on-line methods. Roughly speaking, off-line methods detect the underlying baseline signal by statistically analyzing a large fraction of the gathered detector input [8] samples from which more accurate statistics may be gathered and from which non-causal inferences may then be obtained (e.g. the forward-backward algorithm and variants of such as described in "Optimal decoding of linear codes for minimizing symbol error rate" by L. Bahl, J. Cocke, F. Jelinek, and J. Raviv in *IEEE Trans. Info. Theory*, 20, (March 1974), pp. 284-287). A discussion of off-line methods is give in "Data analysis methods for solid-state nanopores" by C. Plesa and C. Dekker in *Nanotechnology*, 26 (2015).

In a number of cases, off-line methods do not begin until all the data of interest from the detector input [8] has been gathered. These properties allow off-line approaches to achieve good approximation accuracy because extensive and detailed statistics associated with the measurement can be applied to the detection and identification problem. Conversely on-line methods process a relatively small set of detector input [8] samples and tend to be required to do so in temporal order with zero or very little delay between the detector input [8] and the corresponding detector output [9]. From a practical perspective, the excessive number of samples that an off-line method must process to produce an output significantly constrains its utility in real-time applications where the delay D between the detector input [8] at time k, $x_k$, and its corresponding approximation at the detector output or [9], $y_{k-D}$, is sufficiently small. To illustrate the difference, where an off-line method may require 10s or 100s or 1000s of samples of the detector input [8] sequence, $x_k$, before being able to produce a detector output [9], an on-line method may require less than 10 samples. For applications that require minimal delay between initiation and detection plus identification such as communications, alarms, surveillance, and autonomous monitoring systems that must accommodate the continuous flow of input and output information in real-time, on-line methods are indispensable. The challenge in this case is to devise means by which such real-time detection and identification can be generated with sufficient accuracy.

A related aspect of a useful detector [3] is its ability to maintain adequately accurate on-line signal detection and identification in the face of a low-quality front-end chain [4]. This ability is advantageous because it allows a low-cost front-end chain [4] to be used. This ability is also advantageous because the use of a low-cost front-end chain [4] allows the implementation of a multi-channel detection and identification apparatus processing multiple signals simultaneously via multiple front-end chain [4] components. This ability to aggregate a multitude of front-end chain [4] components directing signals from a multitude of transducer [1] components can greatly increase the data throughput through a communication or sensing system.

The challenge faced by a detector [3] preceded by a low-quality front-end chain [4] is not only an increased noise and distortion, but also the need to deal, in a statistical sense, with a broader range of signal distributions. Thus, not only may a detector [3] preceded by a low-quality front-end chain [4] face a higher second central moment (again, in the statistical sense), but may also have to process a broader variety of probability distributions (e.g. Gaussian, Laplacian, etc.) associated with the signal. Unless a sufficiently robust detection and identification method and apparatus is made available the variety of probability distributions presented at the detector input [8] could substantially compromise the accuracy of the detector [3].

An on-line method for the detection of events in a piecewise-constant signal is the cumulative-sum (CUSUM) technique originally introduced in the article, "Continuous inspection schemes" by E. S. Page *Biometrika*, 41 (1954), pp. 100-115. This scheme continues to be employed for modern applications, one example in the field of nanopore-based molecular detection being described in the article, "Fast and automatic processing of multi-level events in nanopore translocation experiments," by C. Raillon, P. Granjon, M. Graf, L. J. Steinbock, and A. Radenovic *Nanoscale*, 4 (2012), pp. 4916-4924.

A detector realized to process its input signal using the CUSUM technique accumulates a sequence of test statistics (i.e. numerical values derived from the detector input [8] samples, $x_k$, and their purported statistical properties) and subjects these accumulated (or cumulative) statistics to a threshold test. If the accumulated statistics exceed a pre-determined or dynamically determined threshold value then an event is said to have been detected. The accumulation of a test statistic and its comparison to a threshold is the essence of on-line CUSUM detection and remaining issues associated with event identification fall outside the narrow scope of this approach as discussed in the text *Detection of Abrupt Changes* by M. Basseville and I. V. Nikiforov, Prentice-Hall (1993). As a result means and apparatus of rapid and accurate on-line detection and identification of piecewise-constant signals subject to noise and distortion are open to substantial improvement as these must couple event detection with the identification (i.e. estimation) of event times and event levels. The joint accomplishment of these three main criteria (i.e. event detection, event time identification, and event level identification) form the core of the method outlined in this disclosure.

This need for detection and identification is especially acute in the case of piecewise-constant signals not subject to a known or approximate clock or to a clock highly compromised by noise or jitter. In other words event level and event duration detection and identification becomes particularly challenging in the case of asynchronous signals as opposed to synchronous signals, or if the signal event durations possess a substantial random distribution with a large variation around the mean. In the case of piecewise-constant signals that are synchronous or do not exhibit excessive event time variation established on-line methods of timing error detection can be applied such as phase-locked-loop-based (PLL-based) timing estimation (described in "Carrier and bit synchronization in data communications—A tutorial review" by L. Franks *IEEE Trans. Comm.* 28 (1980), pp. 1107-1120) and maximum-likelihood timing estimation (described in "Demodulator reference recovery techniques suited for digital communications" by F. Gardner *Final Report, European Space Agency* ESTEC Contract No. 6847/86/NL/DG (1988) and "A class of data-aided timing recovery schemes" by J. Bergmans and H. Wong-Lam *IEEE Trans. Comm.* 43 (1995) pp. 1819-1827.) With such components in place a detection method based on a component such as a matched filter as discussed in "An analysis of the factors which determine signal/noise discrimination in pulsed-carrier systems" by D. O. North *Proc. of the IEEE*, 51 (1963), pp. 1016-1027 becomes possible. In the case of asynchronous signals or signals with substantial random distribution in event times which occur in certain human-made signals and which is often the case with naturally occurring phenomena the established on-line synchronous methods such as those based on the matched filter operate at inadequate levels of accuracy.

SUMMARY OF THE INVENTION

Many communications and measurement systems operate on emitted information messages/data that ideally assume the form of a piecewise-constant signal stream as shown in FIG. 1. Such a signal may occur over one or over numerous channels. The receivers of such messages must adequately detect the presence of these levels and identify their amplitude and temporal signature to realize a practical link between the source and destination of the intended information. The achievement of adequate detection and identification is complicated by the fact that the original source signal is compromised by noise and distortion during the message transmission process through its respective channel.

An accurate means of processing such noisy signals for the purpose of detection and identification often includes so-called "off-line" methods that store a complete or a substantial part of the message/data stream. This approach gives the detection and identification units access to global signal statistics and in essence allows it to apply broadly spanning anti-causal methods for the recovery of the underlying message. As a result an accurate detection and identification of the underlying signal can be achieved using off-line methods. However off-line methods are not appropriate for real-time communication and measurement systems. This is the case by virtue of the need for off-line methods to capture substantial parts of the signal stream before subjecting it to processing. Further, the memory requirements of off-line methods call for greater hardware resources therefore increasing cost and compromising the portability of the system as subject to size and energy needs.

By contrast so-called "on-line" detection and identification units that process the message as it streams through them are possible. This ability to operate on the input data and to extract the required information as new message samples become available enables real-time operation with reduced memory requirements relative to off-line techniques. In high-speed communications applications on-line techniques typically take advantage of a known or predetermined data periodicity capable of greatly simplifying the detection and identification objectives of the system. These methods are not applicable to communication or measured systems with compromised synchrony or asynchronous systems that abandon clocking methods altogether. The latter scenario is especially common in measurement and alarm systems.

The cumulative sum (CUSUM) method is a means of detecting the occurrence of change in a time-series without resort to any information on signal periodicity as considered above. In the art, this method is capable of detecting a change, but, alone, does not identifying the value of the new level. Further, the standard CUSUM method requires complementary implementations to recognize the polarity of a change. Also, the CUSUM method's accuracy is based upon certain assumptions on the statistics of the incoming noisy data (e.g. the probabilistic distribution of the data and its standard deviation). Should these assumptions not be appropriate for the incoming signal a substantial degradation in the accuracy of the method can be observed.

The present invention advances the state of the art in terms of on-line detection and identification of piecewise-constant signals corrupted by noise and distortion. It detects and identifies these signals without any prior knowledge on the possible timing of the transitions between levels. It is advantageous in its resistance to noise and distortion, both in their level and probabilistic variety by its combination of noise filtering policies working in conjunction with nonlinear decision units and on-line error removal blocks.

BRIEF DESCRIPTION OF THE DRAWINGS

For a more complete understanding of the invention, reference is made to the following description and accompanying drawings, in which.

DETAILED DESCRIPTION OF THE INVENTION

Following below are more detailed descriptions of various concepts related to, and embodiments of, inventive methods and apparatus for on-line high-speed signal event detection and identification. It should be appreciated that various concepts introduced above and detailed below may be implemented in any of a number of ways as the disclosed concepts are not limited to any particular manner of implementation.

Figure 5:
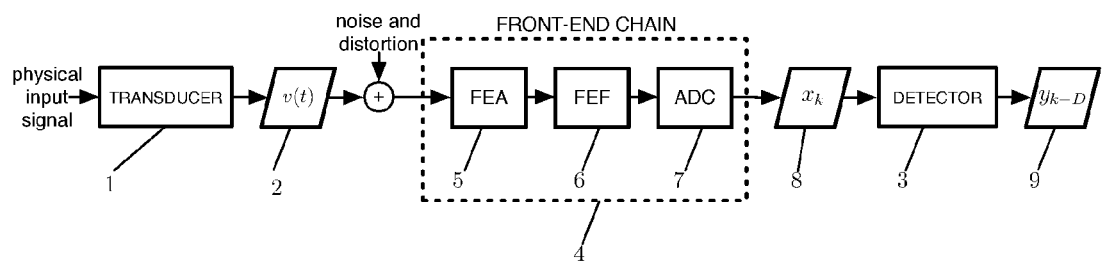
FIG. 5 illustrates the transduction apparatus with detector and example front-end signal conditioning components, FEA (front-end amplifier), FEF (front-end filter), ADC (analog-to-digital-converter)

FIG. 5 illustrates, in an exemplary context not meant to be limiting, a more detailed signal reception scheme of the detector [3], the unit responsible for the online detection and identification of high-speed signals. The exemplary arrangement shown comprises of a transducer [1] and front-end chain [4]. This arrangement is just one possible configuration of a detector [3] within a system intended to process external signals and is not meant to be limiting. For example, the front-end chain [4] may be entirely dispensed with and the detector [3] attached directly to the noisy and distorted transducer [1] output.

Ideally, the transducer [1] converts an external physical input signal into an analog signal [2] v(t) that is a perfect signal replica of the original physical input. In reality however a number of implementation non-idealities corrupt v(t) with the addition of noise and distortion. It is the function of the detector [3] to identify the features of the ideal analog signal [2] v(t) within this corrupted signal and to generate a detector output [9] y[k−D] sufficiently alike to the ideal analog signal [2] v(t).

In general, the front-end chain [4] prepares or "conditions" the, possibly corrupted by noise and distortion, analog signal [2] into a signal suitable to serve as the detector input [8]. One example of this conditioning is the action of boosting the amplitude (e.g. the signal's energy or power) of the signal to levels that can be adequately processed by the detector [3]. In an exemplary embodiment the detector input [8] may be of a sampled discrete-time form and thus may appear as a time-series, $x_k$=x[k], as shown in FIG. 5. In another embodiment, the detector input [8] may be continuous-time in form.

The ideal analog signal [2] from the transducer [1] is exactly proportional to the physical phenomena that excites the input of the transducer [1]. However the ideal analog signal [2] may be corrupted by noise and distortion from the transducer [1]. The detector input [8] signal may also be corrupted by noise and distortion from the transducer [1] as well as by noise and distortion from the front-end chain [4].

The requirement of the detector [3] is to produce a detector output [9] that matches, as accurately as needed by the application in which the detector [3] is used, the ideal analog signal [2] from the transducer [1]. This requirement implies that a function of the detector [3] is to detect and identify the detector input [8] such that the detector output [9] is as accurate a match to the ideal analog signal [2] as needed by the application.

Without limiting the detector [3] embodiment, the detector output [9] may also be a discrete-time signal and thus appear as a time-series symbolized by $y_{k-D}$=y[k−D] in FIG. 5 where D represents a possible time delay. The detector output [9] could also be a continuous-time analog signal.

Figure 10:
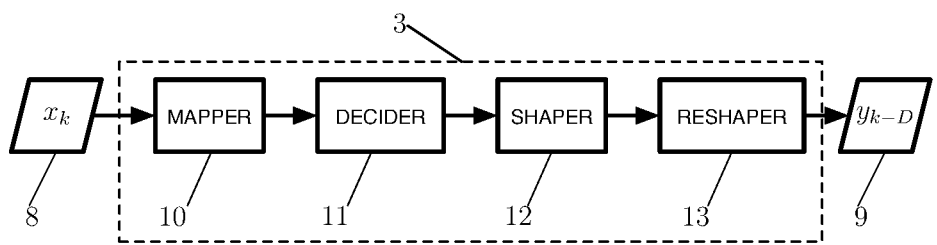
FIG. 10 illustrates the detector represented as four separate blocks each contributing to the detector's detection and inspection functions.

For the purpose of clarity, without limiting the embodiment, the on-line detector [3] may be organized as shown in FIG. 10 where the detector [3] is expressed in terms of four functional blocks. Alternate embodiments may be expressed in terms of functions that represent some combinations of the functional blocks shown in FIG. 10.

In the exemplary embodiment of FIG. 10, the mapper [10] block makes an initial guess as to the event level that the detector input [8] $x_k$ corresponds to. The guess that is made attributes the detector input [8] $x_k$ to one of the L event levels (i.e. $v_1, v_2, \ldots, v_L$) associated with the piecewise signal under consideration.

The Applicants generally refer to this attribution or guess of $x_k$ by the mapper [10] or an equivalent unit to an event level as a "map" or a "mapping". The event levels to which a mapping is done may be intrinsic to the actual signal being detected or they could be artificially defined as per some pre-existing or some learned model of the signal's available event levels.

The mapping made by the mapper [10] or equivalent unit constitutes an early and possibly approximate identification step in the detector [3] embodiment. The accuracy of the approximation depends on its computational and/or algorithmic sophistication. Typically, a less sophisticated approximation is quicker to compute and hence becomes more advantageous for high-speed real-time applications. The guess made by the mapper [10] may be informed by any of a number of mapping policies some of which are discussed below.

The decider [11] block shown in FIG. 10 or an equivalent unit makes event detection decisions. The result of these decisions is a judgement on which event a sample of data belongs to or is representative of. The decider [11] may decide that the sample belongs to the current event i or the decider [11] may decide that the sample belongs to some event other than the current event i. As such, the decider [11] is continually monitoring the detector input [8] for the appearance of new events. The decider [11] may apply any of a number of event detection policies as part of its signal monitoring action.

The shaper [12] block shown in FIG. 10 or an equivalent unit calculates and stores the event durations and stores the event levels initially identified by the joint action of the mapper [10] and decider [11] blocks of the detector [3]. By delineating event durations the shaper [12] offers the possibility to guide the behaviour and operation of the units preceding it or their equivalents such as the mapper [10] and/or the decider [11].

The reshaper [13] block shown in FIG. 10 can correct identification errors made by the preceding components of the detector [3] and hence produce a more accurate final detector output [9] in either discrete-time or continuous-time form. By virtue of its control over the final output waveform the reshaper [13] may also serve to guide the behaviour and operation of the units preceding it or their equivalents such as the mapper [10] and/or the decider [11] and/or the shaper [12].

Figure 11:
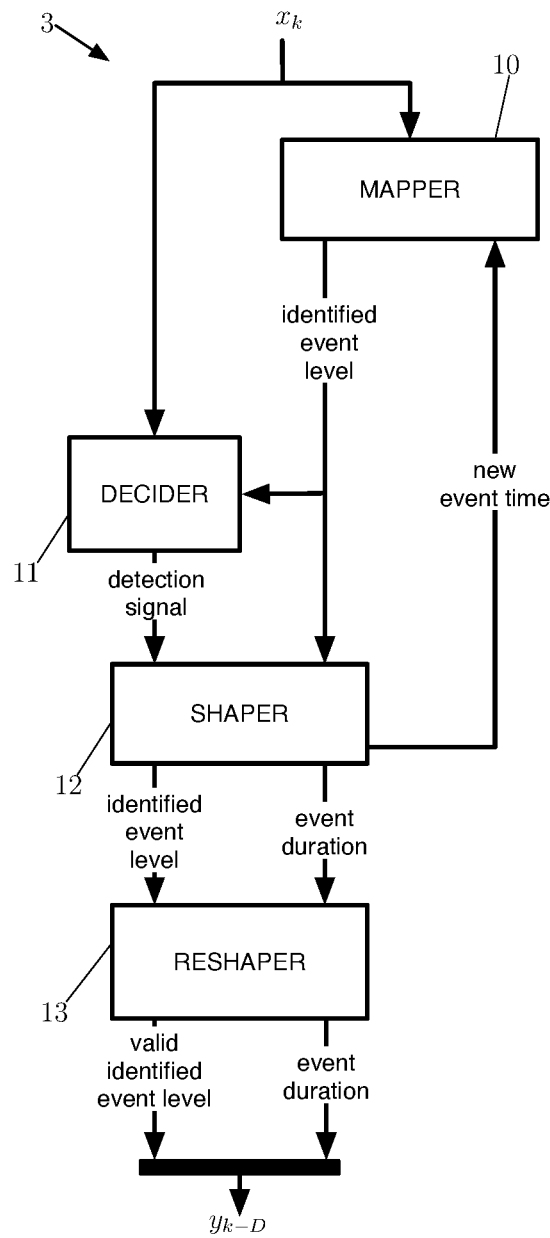
FIG. 11 illustrates in the detector represented as four separate blocks with the interconnection between blocks further detailed.

To further clarify the relations and interconnections between the components of the detector [3] discussed above another, more detailed, diagram of the detector [3] is shown in FIG. 11.

The inventive aspects expounded above and further inventive aspects of the detection and identification method and apparatus are described below in the context of a more detailed, but not a limiting embodiment.

Mapper

Figure 1:
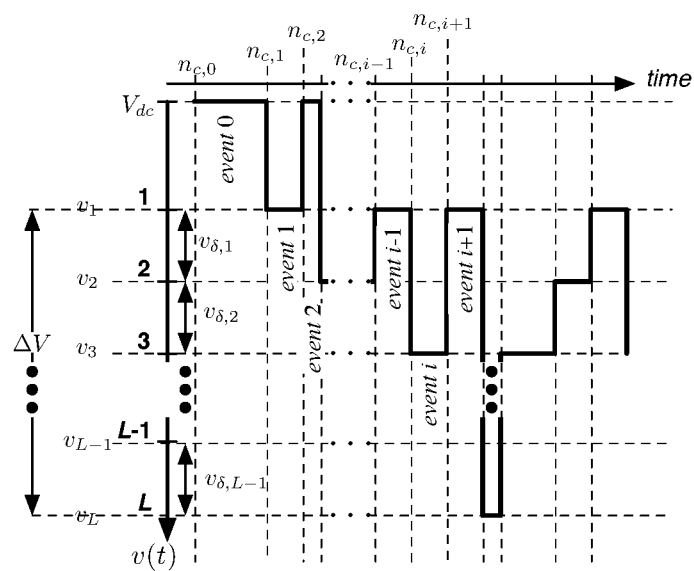
FIG. 1 illustrates a noiseless piecewise constant signal, v(t)
Figure 2:
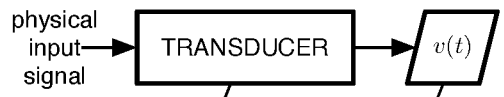
FIG. 2 illustrates the general arrangement by which a physical piecewise constant input signal is converted to an equivalent electronic signal v(t) by a transducer.
Figure 3:
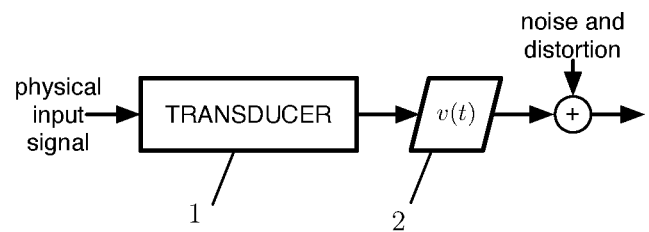
FIG. 3 illustrates the transduction apparatus with noise and distortion present.
Figure 4:
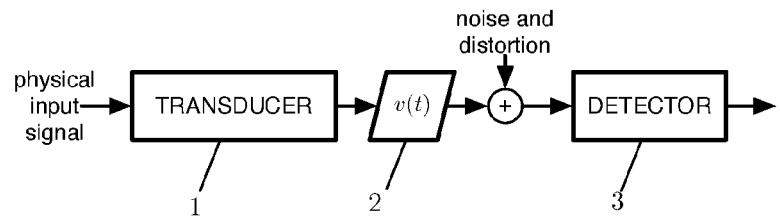
FIG. 4 illustrates the transduction apparatus with noise and distortion present as well as the detector to mitigate these non-idealities.
Figure 6:
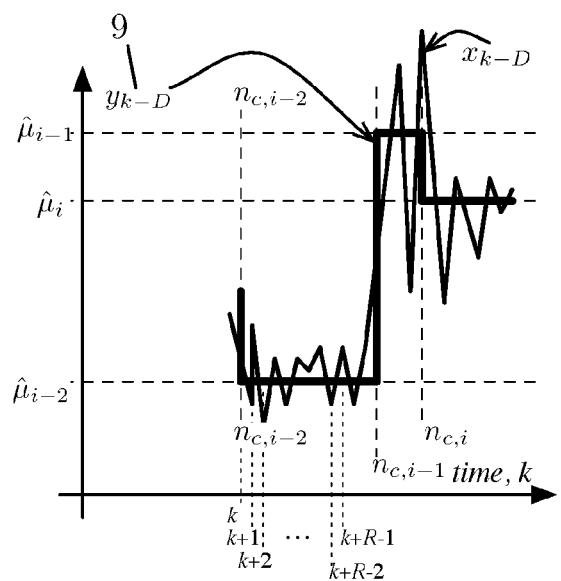
FIG. 6 illustrates the relationship between the detector output time-series, $y_{k-D}$, and a delayed version of the detector input time-series, $x_{k-D}$.

Examples of the time index variables associated with the temporal boundaries of events are shown in FIG. 1 and FIG. 6. The beginning of each new event is denoted by the Applicants to occur event time index values $n_{c,i}$ where the integer label i refers to the new event i.

In the context of the entire detector [3], the mapper [10] approximates the event level that a new event i corresponds to. The approximation made by the mapper [10] of the event level corresponding to event i is symbolized by $\hat{\mu}_i$ in this disclosure. The event level approximation $\hat{\mu}_i$ is drawn by the mapper [10] from the set C={$v_1, v_2, \ldots v_L$} of event level values as exemplified in the illustration of FIG. 1. These values may be intrinsic to the underlying analog signal [2] v(t) being detected or they could be artificially defined as per some pre-existing or some learned model of the underlying signal's available event levels.

More specifically, during a period of time assumed by the detector to correspond to an event i−1, the mapper [10] or equivalent unit may be informed by another component of the detector [3] that a new event i has been detected. The detector [3] then approximates the event level of this new event i is $\hat{\mu}_i$. For the purpose of the following discussion the a "map" or a "mapping" is defined as such an approximation made by the mapper [10]. The action of the mapper [10] resulting in the mapping of a new event i to $\hat{\mu}_i$ is guided by some "mapping policy". The symbol $\hat{\mu}_i$ may be referred to as the "mapped event level" (for event i).

The mapping carried out by the mapper [10] serves as an initial identification of an event level and is suitable for on-line detection and identification intended to operate in real-time with minimal delay between the detector input [8] and detector output [9]. Further, this initial identification from the mapper [10] is available for use in the remainder of the detector [3] such as the decider [11] and/or the shaper [12] and/or the reshaper [13] or equivalent unit thereto.

Any of a number of mapping policies may be used to achieve mapping. The objectives of these policies may be succinctly stated as $$\hat{\mu}_i = \underset{l \in C}{\operatorname{argmin}}\left\{d\left(x_{i,k} \mid_{n_{c,i}}^{n_{c,i}+R-1}, l\right)\right\} \quad (3)$$

where l is an element of the set C containing the discrete signal event levels of analog signal [2] v(t) as exemplified by the set $C=\{v_1, v_2, \ldots v_L\}$ of values illustrated in FIG. 1. In expression (3) the symbol $$x_{i,k}|_{n_{c,i}}^{n_{c,i}+R-1}$$

denotes the sequence of R detector input [8] signal samples after the identification of the event time $n_{c,i}$ of the ith event. The symbol k in expression (3) denotes the time index value spanning from $n_{c,i}$ to $n_{c,i}+R-1$). The symbol R in expression (3) denotes the minimum number of samples that any event may comprise of. In other words, the minimum event duration of the analog signal [2] is R samples. Since detector input [8] is ultimately derived from analog signal [2], the minimum event duration of the detector input [8] is also R samples.

The policy objective summarized by expression (3) states that the policy employed by the mapper [10] should seek to map event i to the level $\hat{\mu}_i$ whose value is l where l is chosen from the set C such that the "distance" $d(\bullet, \bullet)$ between the level, l, chosen by the mapper [10] and the sequence $$x_{i,k}|_{n_{c,i}}^{n_{c,i}+R-1}$$

is a minimum.

The mapping policies utilized by the mapper [10] are distinguished by their definition of the distance $d(\bullet, \bullet)$ in expression (3). A non-limiting example of a policy is one that employs a Manhattan distance (or 1-norm distance or $L_1$ distance)

$$d(x_{i,k}|_{n_{c,i}}^{n_{c,i}+R-1}, l) = |\mu_i - l| \qquad (4)$$

where $\mu_i$ is the average over the R samples encompassed by the symbol $$x_{i,k}|_{n_{c,i}}^{n_{c,i}+R-1}.$$

More succinctly we can express $\mu_i$ with the equivalence $$\mu_i = \frac{1}{R}\sum_{n=0}^{R-1} x[n_{c,i} + n]. \qquad (5)$$

Another non-limiting example of a mapping policy is one that employs a Euclidean distance (or 2-norm distance or $L_2$ distance)

$$d(x_{i,k}|_{n_{c,i}}^{n_{c,i}+R-1}, l) = \frac{1}{R}\sqrt{\sum_{n=0}^{R-1}(x_i[n_{c,i} + n] - l)^2}. \qquad (6)$$

Another non-limiting example of a mapping policy is one that employs function transforms $f(\bullet)$ resulting in general distance expressions $$d(f(x_{i,k})|_{n_{c,i}}^{n_{c,i}+R-1}, l).$$

For example, $f(\bullet)$ may serve as distortion compensator such as $$f(x_{i,k}) = \frac{x_{i,k}}{1 - e^{\frac{n_{c,i}-k}{\tau}}} \qquad (7)$$

which compensates for the distortion incurred by the signal passing through a system with an impulse response of $h(t)=e^{-t/T}/T$.

More generally the mapping policy may be viewed as a means of minimizing the value of a functional. In a mathematical sense a functional is a mapping of a vector field into a scaler field. In the case of the mapper [10], the functional converts the differences between each of a plurality of samples and an available level l into a scalar or measure. The mapper [10] may then select the l for which this measure is a minimum.

Another non-limiting example of a mapping policy may produce more than one mapped event level for a given set of R samples. These multiple mappings could then be used to compose more sophisticated calculations for identification in the detector [3]. For example multiple mapped event levels could be used to construct more sophisticated test statistics as discussed next.

Decider

The decider [11] is tasked with monitoring the detector input [8] and detecting the arrival of a new event in the detector [3]. In other words, at each time index value k of the detector input [8] $x_k$ the decider [11] makes a decision on whether a new event is present in the detector input [8]. For instance, if the decider [11] has already decided that an event i−1 (also referred to as the i−1th event) has been detected in some continuously streaming detector input [8] it will, at some time index value $k_i$, decide that a following event i has arrived. This decision is contingent on the case that detector input [8] contain more events beyond the i−1th event. The time index value at which the ith event is detected (i.e. decided to be present by the decider [11]) is referred to by the Applicants as the "detection time" or the "alarm time" and labelled with $k_i$.

By working in concert with the mapper [10], the decider [11] arrives at its decision on the presence or absence of an event in an inventive manner. Without limiting the invention, the method by which the decider [11] arrives at its decision may be partitioned into several steps.

A part of the decider's [11] operation involves the calculation of a term sometimes referred to as a "test statistic". At each time-index k and hence at each arriving sample of the detector input [8] $x_k$, the decider [11] calculates a test statistic $s_k$ which can be expressed in general as $$s_k = s[k] = f_{stat}(x_k; \hat{\mu}_i, \delta_{min}) \qquad (8)$$

where the function $f_{stat}(\bullet; \bullet)$ transforms its argument, the random detector input [8] $x_k$, into a test statistic or "weight" $s_k$. Without limiting the embodiment, the function $f_{stat}$ may employ other variables to serve as parameters. Two advantageous parameters already included in the expression (8), but not intended to limit the embodiment, are: 1.) $\hat{\mu}_i$ the identification of the current event level made by the mapper [10] and 2.) $\delta_{min}$ a measure of the minimum expected separation between event levels. For example, in FIG. 1 the separation between event levels is denoted by the set of values $\{v_{\delta,1}, v_{\delta,2}, \ldots, v_{\delta,L-1}\}$ any multiple or combination or transformation of these values may be used to compose $\delta_{min}$.

Any of a variety of functions, $f_{stat}$, may be used by the decider [11] to form the test statistic $s_k$ with a possible setting assuming the arrangement $$s_k = s[k] = \frac{p_X(\hat{\mu}_i + f_\delta(\hat{\mu}_i, \delta_{min}); \hat{\mu}_i, \sigma_i)}{p_X(x_k; \hat{\mu}_i, \sigma_i)} \quad (9)$$

where $p_X(\bullet; \hat{\mu}_i, \sigma_i)$ refers to the probability density function (PDF) of some random process X assumed to posses a first central moment of $\hat{\mu}_i$ and a second central moment of $\sigma_i$, which are noted as parameters of $p_X$ in expression (9). Non-limiting examples of possible PDFs to use in expression (9) include Gaussian distributions, Uniform distributions, Poisson distributions, Binomial distributions, etc.

The numerator and denominator of expression (9) may also be referred to as the "relative likelihood" of the respective arguments of each part of the ratio shown, that is, the $\hat{\mu}_i + f_\delta(\hat{\mu}_i, \delta_{min})$ argument in the numerator and the $x_k$ argument in the denominator. Without limiting the embodiment, in the case of expression (9), the relative likelihood of the arguments is associated with the PDF $p_X(\bullet; \hat{\mu}_i, \sigma_i)$. Alternatively the relative likelihoods of the ratio may use different PDFs, respectively.

A feature of the test statistic summarized in expression (9) is the use of mixed arguments; that is, a multitude of arguments that include not only measured random input values but also estimated values made by other parts of the invention. The Applicants refer to this more general concept as a "mixed-test-statistic". For example, without limiting the embodiment, the denominator of expression (9) employs a stochastic argument, the detector input [8] $x_k$, while the numerator of (9) employs an identified deterministic argument $\hat{\mu}_i$ from the mapper [10] offset by some function $f_\delta(\hat{\mu}_i, \delta_{min})$. An alternate embodiment could employ random arguments such as $x_k$ in the numerator of an expression such as (9) and deterministic estimates such as $\hat{\mu}_i$ in the denominator. Alternatively, mixed versions of expressions such as (9) wherein both random and deterministic terms appear in the denominator or the numerator or both the denominator and numerator are possible.

An example definition of the offset function $f_\delta$ shown in expression (9) that is not intended to be limiting is $f_\delta(\delta_{min}) = \delta_{min}/2$ which is independent of $\hat{\mu}_i$. More elaborate realizations that account for the identified level of the present event i may, without limiting the embodiment, take a form such as $$f_\delta(\hat{\mu}_i, q, C) = \frac{\min[|\hat{\mu}_i - \{v_l : v_l \in C\}|]}{q}. \quad (10)$$

In this expression, $f_\delta$ is a measure of the minimum separation between the mapper [10] estimate $\hat{\mu}_i$ and the available signal levels l chosen from the set $C = \{v_1, v_2, \ldots, v_l, \ldots, v_L\}$. The value may be scaled by some number q. Such a calculation may be useful, for example, in the case where the discrete levels of analog signal [2] v(t) are not uniformly distributed.

More elaborate selection for $f_\delta$ are possible including those that assume more parameters than noted above. For example, without limiting the embodiment, an offset function including the second central moment $\sigma_i$ of $$x_{i,k}|_{n_c,i}^{n_c,i+R-1}$$

may be included as in $$f_\delta(\hat{\mu}_i, \sigma_i, m, o, q, C) = \frac{\min[|\hat{\mu}_i - \{v_l : v_l \in C\}|] - m \cdot \sigma_i + o}{q} \quad (11)$$

where m is some numerical multiplicative scaling term and o is some offset term and the terms $v_1$, C, and q are as noted above. To account for the possibilities of different arguments the Applicants generalize the expression of the offset function to $f_\delta(\bullet)$.

In general, the mixed-test-statistic $s_k$ shown in expression (9) represents a weight indicating the relative statistical proximity of the stochastic signal sample $x_k$ to either the level $\hat{\mu}_i$ or the level $\hat{\mu}_i + f_\delta(\bullet)$. The greater the value of $s_k$ for a given $x_k$ the more likely that this $x_k$ is representative of an event that is removed from the presently identified ith event level $\hat{\mu}_i$ by at least $f_\delta(\bullet)$.

In terms of prevailing terminology in the art, the denominator of expression (9) is referred to by the Applicants as the "in-control event"; this component of expression (9) measures the likelihood that the kth stochastic detector input [8] sample $x_k$ is drawn from the present (in-control) event i whose event level has been approximately identified by the mapper to be $\hat{\mu}_i$. At the same time the numerator of expression (9) weighs the likelihood of an "out-of-control event", that is, the upcoming event, i+1, which, by definition, possesses an event level different from that associated with the in-control event.

Without limiting the embodiment, in expression (9) the out-of-control event is stipulated as $\hat{\mu}_i + f_\delta(\bullet)$. In other words the out-of-control event is stipulated in terms of some value offset by $f_\delta(\bullet)$ from the estimate of the event level of the in-control event i. More generally the out-of-control event may be stated as some function $f_{oc}(\hat{\mu}_i)$ of the estimate of the of the event level of the in-control event i. With such settings, the numerator of expression (9) measures the likelihood that the in-control event level $\hat{\mu}_i$ or some function of it $f_{oc}(\hat{\mu}_i)$ deviates into an out-of-control event given an expected level $\hat{\mu}_i$ and disturbances with second central moment, $\sigma_i$.

Although there is statistical uncertainty in $x_k$ due to its corruption by random noise and potentially unknown distortion due to the transducer [1] and possibly the front-end chain [4], the values $\hat{\mu}_i$ and $\delta_{min}$ are not random and hence are not subject to any further noise disturbance. This use of deterministic values within the calculation of the test statistic serves as advantage of the embodiment in that it provides a means to control noise and hence affords the use of the disclosed method for detection and identification in embodiments subject to large and statistically varied disturbances from the transducer [1] and front-end chain [4].

For probability density functions $p_X(x_k; \hat{\mu}_i, \sigma_i)$ that possess opposite-sign slopes with respect to the argument $x_k$ around the mapped level $\hat{\mu}_i$, the decider [11] test statistic $s_k$ identified in expression (9), or various other embodiments of expression (9) as noted above, is capable of weighing both positive and negative deviations from $\hat{\mu}_i$. In other words, a test statistic of the form shown in expression (9) is, capable of simultaneously weighing both $\pm f_\delta(\hat{\mu}_i, \delta_{min})$ deviations in $x_k$ from $\hat{\mu}_i$.

It is sometimes computationally convenient for the decider [11] to operate with the logarithm of the test statistic presented in expression (9) such that a related expression of the decider [11] test statistic setting is $$s_k^l = s^l[k] = \ln\left[\frac{p_X(\hat{\mu}_i + f_\delta(\cdot); \hat{\mu}_i, \sigma_i)}{p_X(x_k; \hat{\mu}_i, \sigma_i)}\right]. \quad (12)$$

The use of expression (12) does not compromise any of the advantageous characteristics of the embodiments identified and discussed above and is amenable to the alternative embodiments outlined for expression (9) above.

The next steps in the event detection process of the decider [11] accumulate the test statistics using a "decision function" and subject this decision function value to a threshold test. A decision function G can be constructed recursively using $$G_{i,k} = G_i[k] = \max(G_i[k-1] + s^l[k], 0) \quad (13)$$

where the function max(•, 0) is equal to the larger of its two arguments. The notation $G_{i,k}$ denotes the value of the decision function at time index value k while, in terms employed by the Applicants in this disclosure, the value i is meant to indicate that most recently detected event, the in-control event, is the ith event.

When $G_{i,k}|_{k=k_{i+1}} \geq h$, where h is a pre-determined or dynamically adjusted threshold value, the decider [11] decides that a new event, the i+1th event, has been detected. The time index value at which this threshold value h is first matched or exceeded by the decision function $G_{i,k}$ is labelled with $k_{i+1}$ for the purposes of this discussion. Thus, $k_{i+1}$ denotes, as termed by the Applicants, the "detection time" (also referred to as the "alarm time" or a "detection event" or an "alarm event") associated with event i+1. In other words, $k_{i+1}$ denotes the sample time index value at which the occurrence of a new event i+1 is first detected by the decider [11], or equivalent unit, of the detector [3].

The use of the decider [11] to decide whether a detection time has been reached does not limit this aspect of the detector [3] to only this function. Indeed the decider [11] (or equivalent) within the detector [3] may be used to arrive at other decisions relevant to the detection and identification process in parallel with its ability to decide on the detection time. An example of an accompanying decision that the decider [11] may make is on the arrival of an event time. That is, not only may the decider [11] decide that a particular time index $k_{i+1}$ corresponds to a detection time; the decider [11], or an equivalent unit, may also compute the actual event time $n_{c,i+1}$ corresponding to this i+1th event. In the interests of on-line operation the decision of the decider [11] regarding the event time should be made in such a way as to maintain real-time operation on the part of the detector [3].

To enable the decider [11] to produce an event time decision, the test statistics $s_k$ or $s_k^l$ may be aggregated in such a way as to compile a new weight term, or "cumulative test statistic", that effectively accounts not only for the present sample $x_k$, but also accounts for preceding samples in time. In the case of $s_k^l$ this aggregation can be expressed in the form of an additive accumulation $$S_{i,k} = S_i[k] = \sum_{m=n_{c,i}}^{k} s^l[m] \quad (14)$$

where the subscript i is used to denote the event to which the cumulative test statistic $S_{i,k}$ corresponds. As already noted with reference to FIG. 1 and FIG. 6, the variable $n_{c,i}$ denotes the event time of event i; the discrete time index value at which event i begins. As revealed by the form of expression (14), the cumulative test statistic is updated at each new time index value k of the detector input [8] $x_k$.

The nature of $S_{i,k}$ is such that, probabilistically, the minimum value attained by this cumulative statistic occurs at a time index value close to the actual event time $n_{c,i+1}$. Thus, locating the sample at which $S_{i,k}$ achieves a minimum is a means by which an event's event time may be estimated.

However the minimum value of $S_{i,k}$ may not be confirmed until after a detection event at the detection time $k_{i+1}$ that corresponds to the i+1th event. This detection time may occur after the actual even time $n_{c,i+1}$ for the i+1th event. Formally, the means by which the event time for the i+1th event may be calculated can be expressed with $$n_{c,i+1} = \underset{n_{c,i} \leq n \leq k_{i+1}}{\operatorname{argmin}} S_i[n] \quad (15)$$

which states that the event time $n_{c,i+1}$ of the i+1th event lies between the time index values $n_{c,i}$ and $k_{i+1}$ and can be identified by selecting the time index value, n, at which the minimum $S_i$ is achieved.

The expression (15) is non-causal but can be solved in an iterative fashion suitable for on-line operation by updating and recording the minimum obtained $S_i[n]$ over the time interval noted in expression (15). In this manner, throughout the ith event, the decider [11] may periodically generate a tentative signal at different time index values n indicating an updated decision regarding the value of $n_{c,i+1}$. It is only at the detection time $k_{i+1}$ that the last of these signals to be generated is confirmed as the actual decision on the value of $n_{c,i+1}$. Nonetheless, such a confirmation arrives at the desired result: an identification of the i+1th event's event time.

Shaper

The shaper [12] block pictured in FIG. 10, or any equivalent unit of the detector [3], is tasked with identifying, to some approximation, the ideal analog signal [2]. In other words, without limiting the embodiment, the shaper [12] constructs an approximation of the shape of the analog signal [2] (i.e. noise and distortion are ostensibly removed) in terms of each identified event's event level and event time. Alternate embodiments may use different analog signal [2] measures to describe the waveform. For example, event duration may be used in place of event times and event level differences between neighbouring events or between other landmarks may be employed by the shaper [12], or an equivalent unit, to describe the approximated shape of the analog signal [2].

The Applicants refer to the approximate shape of the analog signal [2] formed by the shaper [12] as the "shape". In the case of piecewise-constant signals the shape is defined by a series of event levels $\hat{\mu}_i$ and their corresponding event times $n_{c,i}$ associated with event i; although, as noted above other measures are possible in alternate embodiments.

The shaper [12] may construct its shape with the help of signals from the mapper [10] and decider [11] or equivalent blocks of the detector [3].

In one embodiment not meant to be limiting, the shaper [12] accepts event level identifications from the mapper [10] and event and detection time decisions from the decider [11]. The shaper [12] uses the decisions made by the decider to identify specific event times and to associate these event times with the corresponding event levels provided by the mapper [10].

In one embodiment not meant to be limiting the shaper [12] may use its shape calculation to influence or adjust the behaviour of the mapper [10] and decider [11]. For example, if the shaper [12] calculates the event time of an event i it can allow the mapper [10], or equivalent unit, to update its policy or execution of a given policy based on such event time information. Similarly, such information from the shaper [12] may be used to update the calculations settings of the decider [11] or equivalent unit.

Reshaper

The reshaper [13] block, or any equivalent component of the detector [3], is tasked with taking the shape formed or computed by the shaper [12], subjecting it to any final corrections, and outputing it as the detector output [9] $y_{k-D}$ in analog or digital or continuous or discrete form.

In one embodiment not meant to be limiting, the reshaper [13] monitors the event levels and event times accrued and calculated by the shaper [12] in its construction of the shape and, at the appropriate time, expresses them in the form of an output signal constituting the detector output [9]. Barring any other information regarding the soundness of the shape properties available from the shaper [12] the reshaper [13] treats these as "valid" event levels and "valid" event times appropriate to dictate the realization of the detector output [9].

In another advantageous embodiment, the reshaper [13] may be enabled with the ability to, in an on-line manner, identify and correct errors within the shape before producing the detector output [9].

As an example of such error correction not meant to limit the embodiment, the reshaper [13] can be made to produce a detector output [9] of improved accuracy (for example, accuracy as defined by the expressions (1) and (2)) by noting events recorded by the shaper [12] whose event durations do not exceed the time required to collect R samples. Such events may be judged by the reshaper [13] as not valid (or "invalid") given that, temporally, they do not exceed the minimum durations of the original phenomenon represented by the analog signal [2]. In the context of this particular on-line error correction scheme the reshaper [13] discards the event level associated with the shape over the invalid duration (i.e. a duration shorter than R) and instead assigns the last noted valid event level to that event duration.

The choice of R can be made without prior knowledge of the minimum analog signal [2] event duration. The choice of R may simply be a reflection of the minimum event time that is desired to be captured accurately or it may be learned as part of a training process.

The union between the mapper [10] and reshaper [13], or analogous functions within an equivalent detector [3] embodiment, is comprised wherein rapid on-line approximations of event levels made by the mapper [10] either remove noise from the test statistic (by virtue of the mapping to $\hat{\mu}_i$ and its ensuing incorporation in $s_k$ or $s_k^j$) or leave characteristic error signatures that are efficiently removed by the reshaper [13].

Performance Results

To demonstrate the performance characteristics of the disclosed detection and identification method a set of simulations are run. The simulations assume a 4-level piecewise-constant signal uniformly centred around zero with a maximum value of 10-nanoamperes (nA) and a minimum event duration of 0.5 microseconds (µs). The transducer [1] is assumed ideal, but an accompanying front-end chain [4] is not assumed ideal. In particular, a FEA [5] with an input referred noise of 5-nV/$\sqrt{}$Hz is used with an equivalent wiring capacitance of 7.15 pF. In the case of the FEF [6], a 2nd-order Butterworth low-pass-filter (LPF) with a 2-MHz 3-dB bandwidth is used followed by an ADC [7] possessing an ideal sampler with resolution made adjustable for performance comparison.

For the purpose of this discussion the Applicants refer to the disclosed method as the "reshaper method" (RM). In these discussions we compare the performance of RM against a classical CUSUM approach that does not employ mapping or error correction (i.e. reshaping) or their equivalents. This CUSUM-based detection and identification method also requires two test statistics to detect either positive or negative deviations from the in-control level. The Applicants refer to this CUSUM-based approach as the "double-sided CUSUM" (DSC) method.

In the RM and DSC comparison a $L_1$ mapping is employed by the RM's mapper [10] without any distortion correction. Also in the RM and DSC comparison an offset $f_\delta(\bullet)=\delta_{min}/2$, is employed in the decider [11] of RM.

Figure 7:
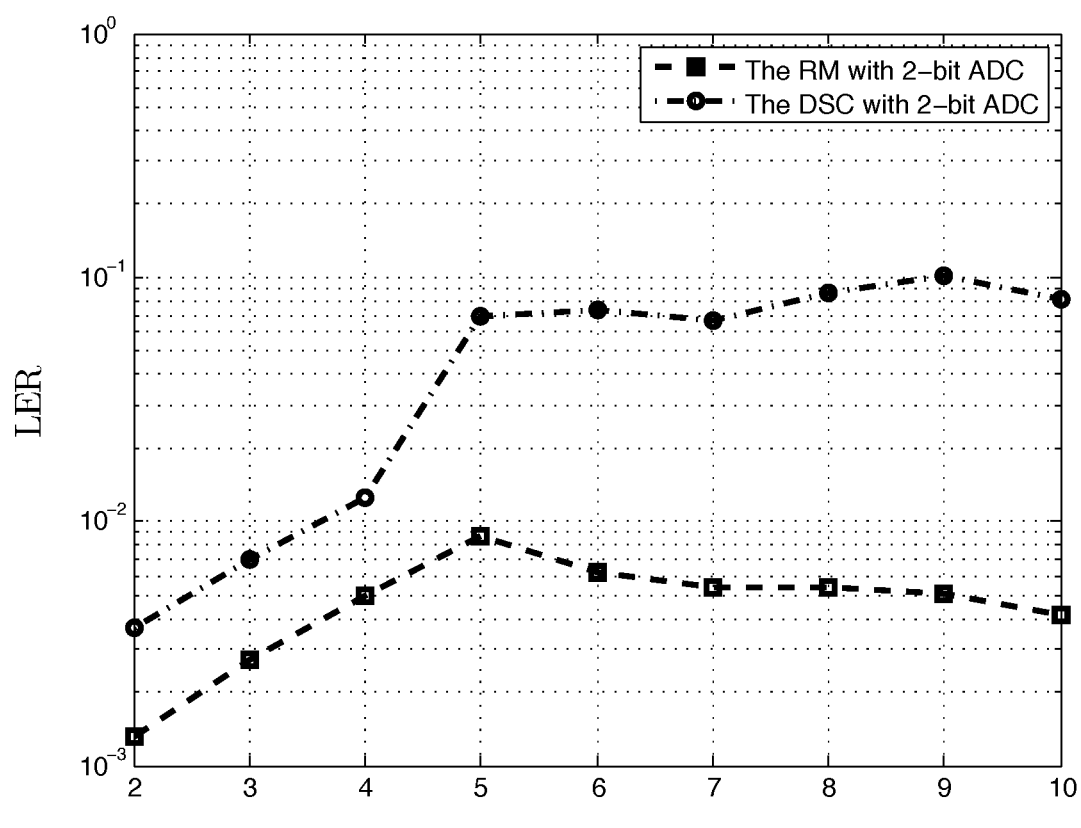
FIG. 7 shows simulations of the detector level error rate results.
Figure 8:
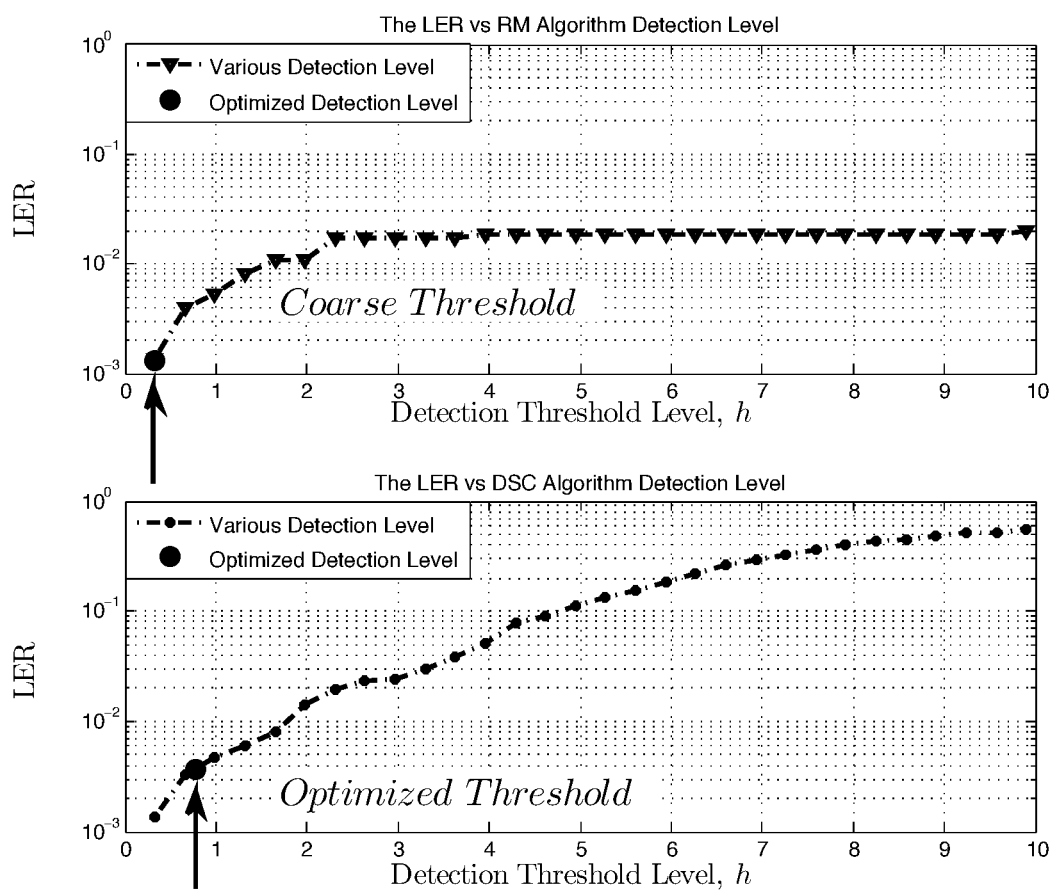
FIG. 8 shows simulations of the level error rate results as a function of threshold setting.

The proportion of event levels incorrectly detected and identified by the RM and DSC detectors—the level-error-rate (LER)—is shown in FIG. 7 as a function of the oversample rate R. The minimum possible ADC [7] resolution, 2-bits, is used reflecting the circumstances of a low-cost front-end chain [4] scenario. While the RM detector manages to stay below a LER of $10^{-2}$ the DSC approach performs an order of magnitude less accurately, a LER= $10^{-1}$, under its worst setting of R=9. The degradation in DSC's LER due to an increase in R is due to the increased amount of frequency-dependent capacitive noise associated with the FEA [5] and allowed to enter the detector through the coarse 2nd-order FEF [6]. In the case of RM, increasing R eventually results in improved mapping decision therefore improving the LER despite the higher noise energy entering the RM detector from the front-end chain [4].

A plot of the RM and DSC LER performance as a function of the detection threshold, h, setting is shown in FIG. For a more consistent comparison an ideal ADC is approximated (i.e. >32 bits resolution is employed) which results in comparable LER performance for the RM and DSC detectors at low settings of h. As the value of h is increased however the steep degradation in DSC's performance highlights its greater sensitivity to threshold setting and variation than RM-based detectors.

Figure 9:
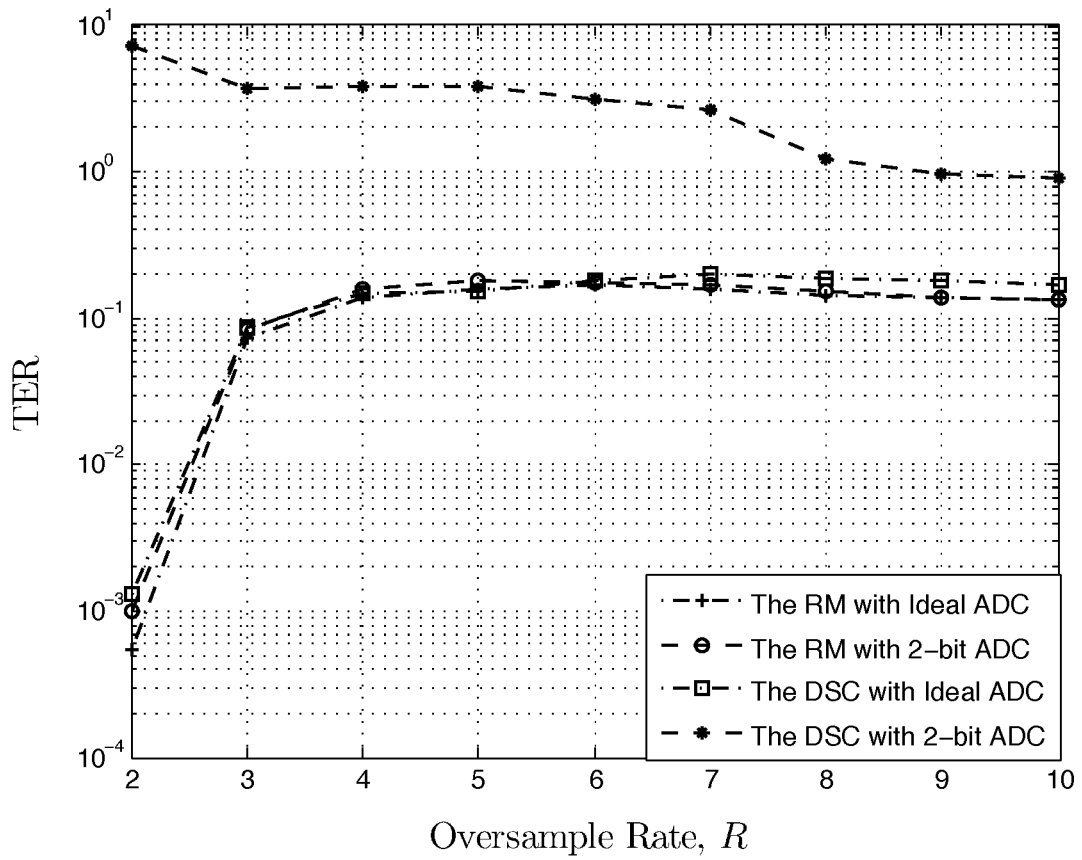
FIG. 9 shows simulations of the detector transition error rate results.

In FIG. 9 detector performance under another metric, the transition error rate (TER), is shown. Again a comparable performance between DSC and RM is obtained under an ideal ADC approximation, however for a 2-bit resolution an accuracy improvement in excess of 1000× is apparent for RM at R=2.

On-Line Detection and Identification Apparatus

For on-line uses of the detection and identification detector [3] described above in high-speed real-time application scenarios, a variety of techniques and apparatus may be used for suitable management of signal flow starting at the detector input [8] and ending with detector output [9]. Methods and apparatus for such purposes are described in this section.

Figure 12:
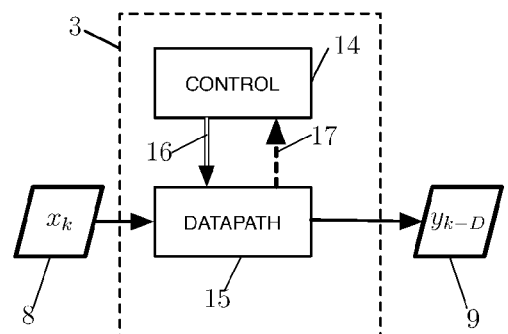
FIG. 12 illustrates a detector apparatus partitioned into two main components through which the data flow and which exchange control and state signals.

FIG. 12 illustrates a possible high-level arrangement of the detector [3] not intended to be limiting. As shown, the apparatus is broadly partitioned into two main features: 1.) the datapath [15] and the control [14]. The datapath [15] accepts the detector input [8] and produces the detector output [9]. The sequence of samples making up the detector input [8] signal flowing within the datapath [15] and the signals derived from it by sub-blocks within the datapath [15] are referred to as the "data signal" or the "data" by the Applicants. The datapath's [15] operation is regulated by a control signal [16] from the control [14]. In turn, the control [14] receives a state signal [17] from the datapath [15] as input to influence its generation of the control signal [16].

Figure 13:
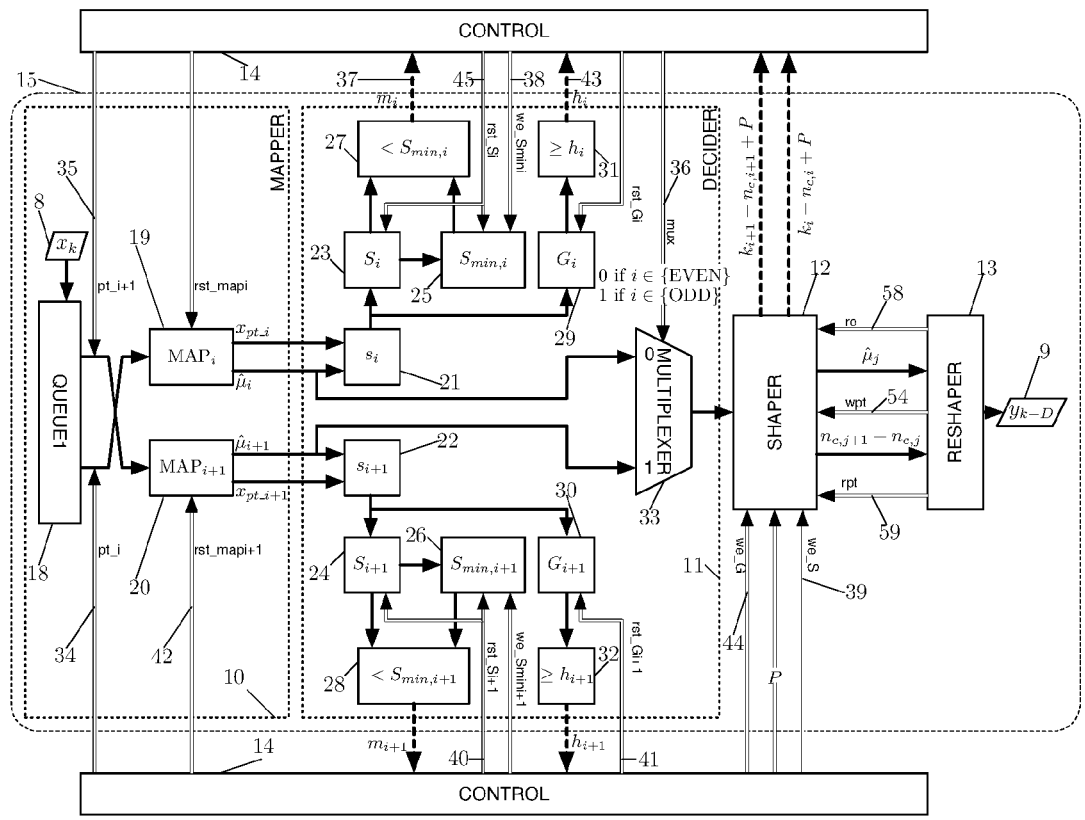
FIG. 13 illustrates the detector in terms of key sub-blocks of the mapper and decider and their positioning relative to the shaper, reshaper, and control blocks.
Figure 14:
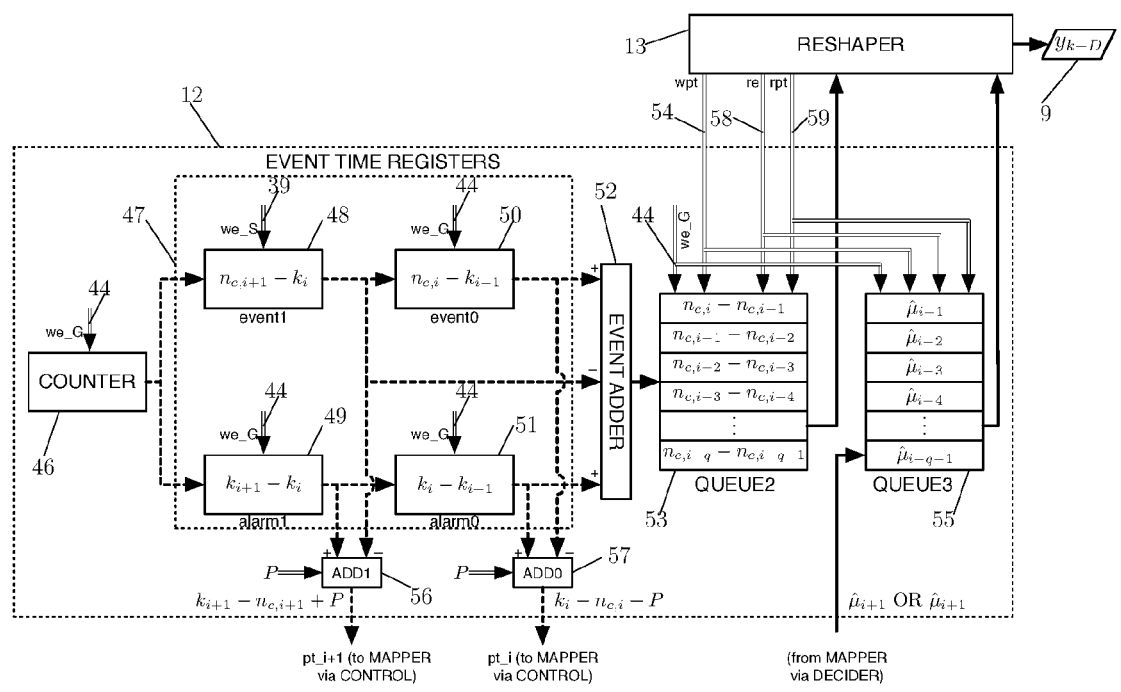
FIG. 14 illustrates the detector's shaper in terms of key sub-blocks and their positioning relative to the reshaper.

As per the above discussion regarding FIG. 12, in the more detailed embodiment diagrams of FIG. 13 and FIG. 14 data signals are represented with solid arrowed lines; control signals are represented with double stroke arrowed lines; and state signals are represented with dashed arrowed lines.

FIG. 13 illustrates a more detailed embodiment of the apparatus shown in FIG. 12 not meant to be limiting. As shown in FIG. 13, the datapath [15] can, without limiting the embodiment, be logically partitioned into four constituents: the mapper [10], decider [11], shaper [12], and reshaper [13].

For illustrative convenience the control [14] is drawn as two blocks in FIG. 13, but logically a unified control unit is to be interpreted. An actual physical instantiation of the embodiment may indeed partition the control [14] over multiple physical blocks.

Any of a number of physical platforms can accommodate the detector [3] embodiment as shown in FIG. 13. In one arrangement not intended to be limiting the apparatus shown in FIG. 13 may be implemented in a semiconductor technology using a field-programmable-gate-array (FPGA) platform. In an alternative arrangement the apparatus shown in FIG. 13 can be customized directly into a semiconductor technology such as CMOS in the form of an application-specific integrated circuit (ASIC). As indicated by FIG. 13 and elaborated further below the datapath [15] may consist of a regular arrangement of arithmetic blocks capable of supporting online data driven processing. This part is readily implemented in FPGA or CMOS form using either hand design or structural design in a hardware description language such as Verilog or VHDL. The control [14] whose functions are described below can be readily implemented in the form of a finite-state machine via a hardware description language and automatically synthesized into a circuit equivalent using any of a number of logical synthesis tools.

As shown in FIG. 13, the datapath [15] funnels its input through the input queue or first-in-first-out (FIFO) block queue1 [18]. The component queue1 [18] is essentially a memory bank containing a multitude of storage locations each of which may have a uniquely assigned storage location address (or just "address"). When queue1 [18] is configured as a FIFO, the data is logically arranged in queue1 [18] in a sequential order related to the relative time that the data entered queue1 [18]. For example, data input to queue1 [18] may be said to be "deeper" than or to "precede" more recent data to enter the queue1 [18]. Two main detector [3] features make the use of the queue1 [18] advantageous to the embodiment.

First, before any samples $x_k$ of a new event can be converted into test statistics in blocks $s_i$ [21] and $s_{i+1}$ [22] a mapping of event i to $\hat{\mu}_i$ needs to be made over the first R samples of that event. Hence at least R samples need to be stored in order to compute $\hat{\mu}_i$ such that at least R samples of $x_k$ are buffered while $\hat{\mu}_i$ is computed. As a result of this delay, any test statistics relying on calculations that combine $\hat{\mu}_i$ and corresponding detector input [8] samples $x_k$ can be carried out.

Second, the unknown delay incurred between the event time $n_{c,i}$ and the detection time $k_i$ requires that the detector [3] be able to jump back and reference previous samples that may correspond to $n_{c,i}$ after an alarm event is triggered at $k_i$. As a result, a buffer of some sort in needed to accommodate such a requirement and queue1 [18] fulfills this and may be considered a form of buffer or, without limiting the embodiment, a buffer circuit.

As discussed in the following section two readout storage locations or addresses from queue1 [18] need to be referenced at any time. At different times it may be that different storage locations may need to be referenced. These readout storage locations are asserted (or "set") by the control signal pointers pt_i [34] and pt_i+1 [35].

The description of one queue1 [18] buffer is not intended to be limiting. Indeed, an adequate alternate embodiment may employ more than one buffer, with each buffer processing either duplicate copies of the detector input [8] signal or some alternating combinations thereof. Further, more generic memory structures may be used in place of the queue such as random access memories of single or multiple read/write ports made adequately responsive to the signals from the control [14] detailed below.

As the detector input [8] samples $x_k$ move through queue1 [18], the samples that occurred earlier in time are effectively present deeper in the FIFO. That is, the older samples are present in storage locations further away or in address locations more remote from newly added detector input [8] samples to queue1 [18].

Thus, when the $k_i$ sample, that is, some sample $x_k$ that ultimately pertains to the detection time of event i, enters queue1 [18], the sample that pertains to the event time is in queue1 [18] storage location $k_i - n_{c,i}$. This is a ramification of the cumulative statistic strategy employed by the detector [3] in which the detection time of event i occur after the event time of event i.

Assuming no delay through the entire datapath [15] calculation chain, the moment that $k_i$ is encountered and hence the threshold h equated by or exceeded by the decision result $G_{i-i}[k_i]$, the control [14] should emit the appropriate control signal pt_i [34] or pt_i+1 [35] to storage location $k_i - n_{c,i}$ in queue1 [18]. This control signal thus adjusts the storage location of queue1 [18], or an equivalent unit, from which previously stored data is output. Such adjustment of output from queue1 [18] allows for the extraction of samples from queue1 [18] that correspond to the appropriate event.

As shown in FIG. 13, the outputs of queue1 [18] which correspond to storage locations identified by (or, equivalently "pointed to") pt_i [34] and pt_i+1 [35], are fed to $MAP_i$ [19] and $MAP_{i+1}$ [20] blocks.

In general, a net delay P may be applied to the detector input [8] data $x_k$ by queue1 [18] to allow the detector [3] the time needed for calculating values such as $\hat{\mu}_i$ which may require the calculation of mapping policies that need to examine a set of previous samples and to possibly compensate for other delays in the datapath [15]. An example of this delay not intended to be limiting is the use of pipelining in any or all of the blocks making up the datapath [15] and the latency incumbent to this approach. Hence general expressions for the control signal pointer values, pt_i [34] and pt_i+1 [35] to the ith and i+1 events respectively are $$pt\_i = k_i - n_{c,i} + P \qquad (16)$$

$$pt\_i+1 = k_{i+1} - n_{c,i+1} + P. \qquad (17)$$

An aspect of the apparatus illustrated in FIG. 13 is the duplication of certain arithmetic blocks in the mapper [10] and the decider [11]. For the purpose of this disclosure the Applicants refer to the following confluence of sub-blocks as the "EVEN" branch or the "i branch" and with the general individual moniker of "even sub-block": MAP$_i$ [19], s$_i$ [21], S$_i$ [23], S$_{min,i}$ [25], <S$_{min,i}$ [27], G$_i$ [29], and ≥h$_i$ [31]. Similarly, for the purpose of this disclosure the Applicants refer to the following confluence of sub-blocks as the "ODD" branch or the "i+1 branch" and with the general individual moniker of "odd sub-block": MAP$_{i+1}$ [20], s$_{i+1}$ [22], S$_{i+1}$ [24], S$_{min,i+1}$ [26], <S$_{min,i+1}$ [28], G$_{i+1}$ [30], and ≥h$_{i+1}$ [32].

The use of the dual-branch arrangement in the detector [3] may be advantageous and convenient in dealing with the aforementioned delay between an event's alarm time k$_i$ and event time n$_{c,i}$, but is not mean to limit the embodiment. In general the dual-branch arrangement allows for the simultaneous calculation and management of certain arithmetic operations associated with detection and identification as detailed below. However, an alternate embodiment may simple employ a single branch, or equivalent to the function of such, capable of alternately handling the operations of both branches. In this case an intermediate storage such as a random-access-memory could be used to store calculations pertaining to alternate branches as needed, while the computational blocks of the one branch are dedicated to the necessary computations. In short this is a form of time-based multiplexed computations. Thus, without loss of generality and without limit to the embodiment we continue to describe the operation of the detector [3] in terms of the EVEN/ODD branches.

An example scenario illustrating the use of the EVEN and ODD branches will be helpful in outlining the detector [3] operation. The Applicants will refer to this example in the following passages as the "present example".

We start the present example of the operation of the detector [3] by assuming the data in the datapath [15] is more than R samples within, or into, event i=2. That is, in time, the most recent data sample available at the output of queue1 [18] is somewhere between k$_2$ and n$_{c,3}$. In this case, the EVEN branch (as opposed to the ODD branch) is actively engaged in the processing of the data signal as generally outlined above. Simultaneously the ODD branch is busy with other calculations that are expound on below.

Under the foregoing description of the operation of the detector [3] and the assumptions of the present example, the MAP$_i$ [19] sub-block has already accomplished its mapping $\hat{\mu}_2$ for event i=2 and is therefore passing along data to the decider [11]; this data is needed to calculate the test statistic via sub-block s$_i$ [21]. MAP$_i$ [19] is taking its input data from queue1 [18] at the storage location or address of queue1 [18] being pointed to (i.e. controlled or selected) by the control signal pt_i [34]. This pointer [34] is set to the value k$_2$-n$_{c,2}$+P by the control [14]. As described further below, this control value originates as a state value in the shaper [12] block that is passed into the control [14] unit.

Simultaneously, the control signal pt_i+1 [35] from the control [14] is set to k$_3$-n$_{c,3}$+P. This control value also originates as a state value emerging from the shaper [12]. This control value determines the queue1 [18] storage location or address, or equivalent, from which MAP$_{i+1}$ [20] draws its samples. As is clarified below, in the present example, the pointer pt_i+1 [35] is undergoing frequent updates due to the combined action of the decider [11] and the shaper [12] or their equivalents.

The mapping of event i from MAP$_i$ [19] $\hat{\mu}_i$ ($\hat{\mu}_2$ in the present example) is passed on to the shaper [12] via the multiplexer [33] whose output is chosen by the control signal mux [36] from the control [14] when the event i is first detected and its mapping made ready.

EVEN Branch

The operation of the EVEN branch of the decider [11] is now further discussed. As the data (core samples $x_{pt\_i}$ and mapped event levels $\hat{\mu}_i$ as shown in FIG. 13) flow into the decider [11] from the EVEN branch of the mapper [10] they are continuously converted into test statistics by the s$_i$ [21] sub-block, as well as cumulative statistics by the S$_i$ [23] sub-block. Data from the s$_i$ [21] sub-block feed the decision function implemented by the G$_i$ [29] sub-block which carries out its calculations in the manner of expression (13).

The output from the S$_i$ [23] sub-block, as exemplified, without limiting the embodiment, by expression (14), is compared using the <S$_{min,1}$ [27] sub-block against the current minimum of the value S$_{i,k}$ which is stored in the S$_{min,i}$ [25] sub-block. If the <S$_{min,i}$ [27] sub-block executing the comparison determines that the current sample from the S$_i$ [23] sub-block is less than the current value stored in the S$_{min,i}$ [25] sub-block then <S$_{min,i}$ [27] asserts a state signal m$_i$ [37] that informs the control [14] of that the most recent calculation of S$_{i,k}$ is lower than any previous minimum of S$_{i,k}$. As a result a control signal, we_Smini [38] is asserted which prompts the current (minimum) value calculated by S$_i$ [23] to be written into S$_{min,i}$ [25]. This is one ramification of the assertion of m$_i$ [37].

The description above, as with certain ensuing descriptions, shows that state signals from the datapath [15] are typically funneled through the control [14] back to the datapath [15] (as control signals). The Applicants are aware that in an alternate embodiment, for certain of these state signals, a directly link between state signals and the intended destination may be possible.

Concurrent with the behaviours described above, upon noting that the output of S$_i$ [23] is less than the value stored in S$_{min,i}$ [25] another control signal, we_S [39], is asserted by the control [14] upon the shaper [12] block. The Applicants also refer to the moment at which a new minimum is found for S$_i$ [23] as the "minimum-decision-time". As is explained when discussing the shaper [12] below, the we_S [39] control signal will prompt the recording of the relative time at which a new minimum of the cumulative statistic is attained. In essence, this relative time is a means of updating, n$_{c,i+1}$; that relative time, in the context of our present example, would be n$_{c,3}$. This is a second ramification of the assertion of m$_i$ [37]

A third ramification of the assertion of m$_i$ [37] is: 1.) the assertion of the control signal rst_Si+1 [40] from the control [14] which resets the ODD branch's S$_{i+1}$ [24] and S$_{min,i+1}$ [26] sub-block output values to zero; 2.) the assertion of rst_Gi+1 [41] which resets the ODD branch's G$_{i+1}$ [30] sub-block output value to zero; and 3.) the assertion of rst_mapi+1 [42] which prompts the MAP$_{i+1}$ [20] sub-block to produce an updated mapping value $\hat{\mu}_{i+1}$.

In parallel with the activities described above, the decision block G$_i$ [29] is carrying out its own calculations. Specifically it calculates the decision quantity per expression

(13) and then feeds this value to the $\geq h_i$ [31] sub-block to check if it is greater or equal to the threshold value, h.

Once the output of $G_i$ [29] is deemed to have reached or exceeded h by the sub-block $\geq h_i$ [31], the alarm time $k_{i+1}$ signifying the i+1 event (i.e. event 3 in our present example signified by the alarm time $k_3$) has been reached. This prompts the $\geq h_i$ [31] sub-block to assert the state signal $h_i$ [43] to the control [14]. In response, the control [14] asserts the control signal we_G [44] to the shaper [12] that causes the shaper [12] to record a term relative to $k_3$ (again the specific value of $k_3$ is recorded in the context of the present example) as detailed below in a following discussion of the shaper [12] block.

Also prompted by the assertion of $h_i$ [43] is a reset of the sub-block $S_i$ [23] and a reset of the sub-block $S_{min,i}$ [25] via the control signal rst_Si [45]. These resets set the output of $S_i$ [23] and the output of $S_{min,i}$ [25] to zero.

ODD Branch

We continue the description of the embodiment with a focus on the ODD branch. As above, the description occasionally cites certain specific settings which are done in the context of the present example noted earlier.

While the EVEN branch of the decider [11] is carrying out its standard processing in search of the alarm time $k_3$ and event time $n_{c,3}$ the ODD branch is engaged in calculations that will allow the detector [3] to immediately process this event, that is event i=3 in the context of the present example, without delay. In other words, by virtue of its calculation, the ODD branch is effectively preparing to enter an operational mode analogous to that of the EVEN branch during the i=2 event when event i=3 is detected. In this general manner the EVEN and ODD branch alternately swap the details of their operation. Thus, over the long run of the detector [3] the EVEN and ODD branch ultimately perform the same general actions in alternating phases. As noted above such an embodiment is not intended to be limiting. The Applicants recognize that the detector [3] can achieve its goal with only one branch which alternates between the behaviours of the EVEN and ODD branches or their equivalent. In such an embodiment intermittent states and calculations of the one branch pertaining to particular phase of operation may be stored in an appropriate memory and recalled as the one branch is required to enter or re-enter that phase of operation.

Using terminology adopted by the Applicants, in the context of the present example, one can describe the EVEN branch of the mapper [10] and the EVEN branch of the decider [11] as carrying out processing on the "incumbent" event. In the present example the event currently being tracked, that is event i=2, is the incumbent event. In the present example, the ODD branch of the mapper [10] and the decider [11] is preparing for the next event i=3. The Applicants refer to this upcoming event as the "candidate" event. Over the long run of the detector [3] the EVEN and ODD branches effectively alternate processing on incumbent and on candidate events. Thus, in the context of the present example, once event i=3 is detected it will become the incumbent event being processed by the ODD branch while the EVEN branch will begin processing in anticipation of the candidate event i=4.

As the EVEN branch is carrying out the steps described above on the incumbent event data (i.e. on the data of the last detected event) the ODD branch is doing the same except that it is doing so on the data effectively emerging from the part of queue1 [18] identified by the control signal pt_i+1 [35] and hence operating on the candidate data that will eventually constitute the next incumbent event. This pre-calculation is advantageous for on-line performance.

Specifically, and again in the context of the present example, and as already described above, each time the EVEN branch asserts the state signal $m_i$ [37] a new candidate event time for event i=3 is effectively discovered. This discovery requires the ODD branch to reset the values in its $S_{i+1}$ [24] and $S_{min,i+1}$ [26] blocks to zero through the assertion of the rst_Si+1 [40] control signal. Such a reset ensures that the ensuing cumulative test statistic in the ODD branch will weigh values associated with the newly discovered event. Also, this discovery causes decision function block $G_{i+1}$ [30] in the ODD branch to reset to zero via the control signal rst_Gi+1 [41]. Along with these developments, the $MAP_{i+1}$ [20] sub-block in the ODD branch is reset to zero via the control signal rst_mapi+1 [42]. The assertion of the state signal $m_i$ [37] also updates a candidate event time estimate in the shaper [12] that updates pt_i+1 [35]. This update can adjust which part or address of the queue1 [18] streams out the data contained within queue1 [18]. As a result, the update of pt_i+1 [35] can lead to an updated set of data being drawn from queue1 [18] for $MAP_{i+1}$ [20] and $s_{i+1}$ [22] to process.

In summary, in the context of the present example, the ODD branch carries out calculations similar to those of the EVEN branch during event i=2, except that the ODD branch is operating on a different set of data in queue1 [18]. Generally, the data that is processed by the branch operating on candidate event follows, in time, the data being processed by the branch processing the incumbent event. In contrast to the EVEN branch for the present example, the ODD branch is not allowed to assert the controls we_S [39] and we_G [44] and is effectively subject to reset commands imposed via the assertion of the state signal $m_i$ [37].

Dual Branch Summary

The dual branch embodiment allows the detector [3] to switch its mapping, test statistic, cumulative test statistic and decision function calculations between two adjacent events without excessive need to pause for recalculations. Recall that there is a delay between an ith event's alarm time $k_i$ and event time $n_{c,i}$ which may impose such pauses. While the incumbent branch is sifting through the data in search for these two events, the candidate branch is constantly recalculating candidate map $\hat{\mu}_j$ (where j is i or i+1 depending on which branch is computing the candidate) such that by the time an alarm at $k_i$ (or at $k_{i+1}$) is sounded, the correct signals from $MAP_i$ [19], $MAP_{i+1}$ [20], $S_i$ [23], $S_{i+1}$ [24], $G_i$ [29], and $G_{i+1}$ [30] are already available. As noted above the Applicants recognize and appreciate that alternate embodiments are possible and have already described such alternates above.

Shaper and Reshaper

Without limiting the invention, FIG. 14 shows in more detail the shaper [12] and reshaper [13] blocks of the detector [3].

The shaper [12] responds to control signals from the control [14] that are originally triggered by data-dependent actions in the decider [11] or an equivalent unit as described above. These control signals prompt the shaper [12] to compute and organize a description of the events that constitute piecewise-constant signal representations of the analog signal [2] as approximated by the mapper [10] and decider [11] or equivalent units. As described previously event descriptions consist of event levels and event times.

In an embodiment not meant to be limiting, the shaper [12] or some equivalent component in the detector [3] may express event times in absolute form, in which case the event times may be defined with respect to a single universal reference value. Another embodiment may express event times in a relative form. In this case event times may be expressed as measures relative to some previous or potentially even future signal and/or event features.

Absolute or relative event time measures may be computed through the use of a counting device (i.e. a counter) or a clock. In an embodiment not meant to be limiting the counter [46] employed in the shaper [12] or equivalent sub-block serves as such a counting device.

In an embodiment not meant to be limiting the counter [46] maintains an integer value count that is incremented by unity each time that a new detector input [8] sample $x_k$ enters the detector [3]. In an alternate embodiment the counter may increment its count based on the pulses of a clock independent of the data.

The integer value count of the counter [46] is fed to a bank of event time registers [47] as shown in FIG. 14. As a result, the counter [46] output is, in general, a linearly incremented integer output, increasing by one in synchrony with the detector input [8] samples or in some known proportion to those samples.

The counter [46] is controlled by the signal we_G [44] from the control [14]. Under typical operation the control signal we_G [44] is prompted by the assertion of the state signal $h_i$ [43], shown in FIG. 13, from the decider [11] to the control [14]. The assertion of $h_i$ [43] is an indication that a new event has been detected (i.e. the detection time or alarm time $k_i$ has been encountered). However this is not intended to be limiting and other contingencies may prompt the control [14] to assert we_G [44] including the even time $n_{c,i}$.

The assertion of we_G [44] resets the counter [46] to zero. Immediately upon reset, or at some pre-designated delay time, the counter [46] reinitiates its incremental output, albeit from its new starting-point at zero. This reset value is not limiting and may be set to some other pre-determined starting point as needed.

As shown in FIG. 14, the output of counter [46] is connected directly to the sub-block event1 [48] and to the sub-block alarm1 [49]. In one embodiment not intended to be limiting, these sub-blocks may be storage devices or "registers" that retain the value presented at their respective inputs by the counter [46] when fed with an appropriate control signal command. In particular event1 [48] will retain its input from the counter [46] when we_S [39] is asserted while alarm1 [49] will retain its input from the control [14] when we_G [44] is asserted.

The values stored in event1 [48] and alarm1 [49] can themselves be stored in another set of sub-blocks given the appropriate control signals. In particular, when we_G [44] is asserted, the value stored in event1 [48] just before the assertion of we_G [44] is stored in event0 [50] and the value store in alarm1 [49] just before the assertion of we_G [44] is stored in alarm0 [51].

The combination of the counter [46] and the event time registers [47] (that is, event1 [48], alarm1 [49], event0 [50], and alarm0 [51]) achieves on-line event time identification. At each detection time $k_i$, indicated by the assertion of we_G [44], the output of counter [46] is reset. Thus, between detection times, the counter [46] effectively calculates the temporal separation, $k_{i+1}-k_i$, between adjacent detection times. This value, $k_{i+1}-k_i$, is stored in alarm1 [49] under the control of we_G [44] (i.e. before the value is cleared from the counter [46]). Simultaneously, upon the assertion of we_S [39] the temporal difference, $n_{c,i+1}-k_i$, effectively computed by the counter [46] at the time of assertion of we_S [39] is captured in event1 [48]. This is the case since the assertion of we_S [39] is prompted by the state signal $m_i$ [37] in FIG. 13 when the EVEN branch is operating on the candidate event an analogous behaviour can be expected of the ODD branch when operating on a candidate event. This prompt and ensuing assertion indicates that a new event time estimate $n_{c,i+1}$ for the next event should be made (in general the Applicants refer to an event i being followed by the next event i+1).

The temporal information gathered by event1 [48] and alarm1 [49] contains temporal differences between event times and detection times. The calculation of temporal differences between event times alone is facilitated by registers event0 [50] and alarm0 [51]. When a new event is detected (and hence we_G [44] is asserted) these sub-blocks capture the information stored in their respective immediate predecessor sub-blocks in the event time registers [47] bank. That is, they capture information that is present in event1 [48] and alarm1 [49] as indicated in FIG. 14. As a result, event0 [50] and alarm0 [51], store temporal differences, $k_{c,i}-k_{i-1}$ and $k_i-k_{i-i}$, respectively. As indicated by the labels in the event time registers [47] in FIG. 14, these temporal difference values stored in event0 [50] and alarm0 [51] comprise of components (i.e. $n_{c,i}$, $k_{i-1}$, and $k_i$) corresponding to event and detection times preceding the content of event1 [48] and alarm1 [49] by one event.

As a result of the temporal difference generation and storage carried out by the counter [46] and the event time registers [47], event durations can be calculated as shown in FIG. 14. In particular, the addition of the values of event0 [50] and alarm0 [51] to the negative of the value in event1 [48] produces the required event duration result (e.g. $n_{c,i}+n_{c,i-1}$). The aforementioned addition is performed by the event adder [52].

In an embodiment not meant to be limiting, the event adder [52] output is stored in the memory bank queue2 [53] upon assertion of we_G [44]. The exact storage location or address of queue2 [53] in which the event adder [52] output is stored is dictated by the control signal wpt [54] emerging from the reshaper [13].

At the same time that the output of event adder [52] is being written into queue2 [53], the memory bank queue3 [55] is also write enabled (i.e. allowed to have new data written into it) by the assertion of we_G [44] and used to store the event level estimate emerging from the multiplexer [33]. The particular memory bank storage location or address in which this event level data is stored is also determined by the wpt [54] control signal from the reshaper [13].

Thus, in the manner described above, the memories queue2 [53] and queue3 [55] are made to store a description of the signal shape in the form of event levels and their corresponding event durations. This arrangement is not intended to be limiting. For instance the Applicants recognize and appreciate that queue2 [53] and queue3 [55] may be implemented as a single memory system. The Applicants also recognize and appreciate that alternate descriptions of the signal shape may be embodied. For example, either absolute or relative event times may be used instead of event durations and relative event levels may be used as well.

The timing information stored in the event time registers [47] may also be used to regulate the flow of information through the EVEN and ODD branches of the detector [3]. As shown in FIG. 14, the data in event1 [48] is subtracted from the data in alarm1 [49] and added to any desired offset P using add1 [56]. Similarly the data in event0 [50] is subtracted from the data in alarm0 [51] and added to any desired offset P using add0 [57]. The output of [57] thus produces an index value $k_i-n_{c,i}+P$ that can be used to identify the memory storage location or address of queue1 [18] which marks the staring location from which the EVEN branch should be extracting its input signal. Simultaneously, the output of [56] produces an index value $k_{i+1}-n_{c,i+1}+P$ that can be used to identify the memory storage location or address of queue1 [18] which marks the starting location from which the ODD branch should be extracting its input signal.

For the generation of the final output the reshaper [13] processes the time duration and event level values in queue2 [53] and queue3 [55]. For multi-port memories the reshaper [13] can accomplish this by reading data from queue2 [53] and queue3 [55] independently of data writes to queue2 [53] and queue3 [55]. The reshaper [13] possesses an independent control signal re [58] that enables reading data from queue2 [53] and queue3 [55]. The reshaper [13] also possesses an independent control signal rpt [59] that selects a particular storage location in queue2 [53] and queue3 [55] to read from.

The ability of the reshaper [13] to independently manage the write and read of queue2 [53] and queue3 [55] allows it to generate an accurate on-line detector output [9]. As the shape is accumulated in queue2 [53] and queue3 [55] the reshaper [13] can extract the stored event data in sequence to generate the output signal. The error correction capability of the reshaper [13] can be implemented very efficiently in this embodiment. As each event duration and event level are read by the reshaper [13], the reshaper [13] can check whether a time duration attributed by preceding detector [3] parts exceeds R. If so, the reshaper [13] generates the corresponding event at the detector output [9] and registers the event level used as a valid level. If not, the reshaper [13] interprets the event as a glitch and assigns the event duration to the last valid event level used.

What is claimed:

1. A method of continuous detection and identification of a corrupted piecewise-constant signal, said corrupted piecewise-constant signal possessing baseline event levels originating from or attributed to a plurality of known levels, the method comprising:

providing in combination an event level estimation means which gathers a plurality of signal samples of said corrupted piecewise-constant signal starting at a given event time and transforms said plurality of signal samples according to a mapping policy to an identified event level selected from said plurality of known levels, providing in combination a signal estimation means which continually receives as estimator inputs of said corrupted piecewise-constant signal and parameter data comprising of at least said identified event level and which will:

continuously transform said estimator inputs into intermittent and contemporaneous estimates of an event duration of said identified event level and of an event time of a next event level succeeding said identified event level and store said event time, store said identified event level as a valid identified event level when said event duration is sufficiently long and output as said identification as an estimated-event-pair comprised of the most recently stored said valid identified event level and comprised of the most recently stored said event time and provide said most recently stored event time to said event level estimation means as a new value for said given event time, wherein said estimated-event-pair and ensuing estimates of said estimated-event-pair over time comprise an identification of the said corrupted piecewise-constant signal achieved via an approximation-driven level estimation scheme coupled with a continuous error correction facility and a change detection scheme driven by estimates of said event level estimation scheme.

2. The method of claim 1, wherein said event level estimation means will:

initially select a mapped level using an initial said plurality of signal samples that start at said given event time that is equal to an initial event time, consequently compute said identified event level given said plurality of signal samples that start at said given event time using said mapping policy that calculates a mathematical function for each member of said plurality of known levels, each said mathematical function consisting of a difference of said plurality of signal samples and said member, said mapping policy then selects as said identified event level a level from said plurality of known levels whose associated said mathematical function is a minimum, provide new computations of said identified event level when receiving a new value for said given event time, wherein any corruption originally present in said corrupted piecewise-constant signal is heretofore eliminated from ensuing calculations employing a result of said event level estimation means.

3. The method of claim 1, wherein said signal estimation means employs a method of transforming said estimator inputs into estimates of the event time of said next event level, the method further comprising:

providing in combination an event-time-deciding means which continually receives said parameter data and continually and in temporal order receives input samples of said corrupted piecewise-constant signal from said initial event time onwards and which will:

sequentially, at each newly received said input sample, and continually, compute a mixed-test-statistic value representing a function of a ratio of a probability density function of a function of said parameter data and a probability density function of a subset of said input samples, cumulate according to a mathematical operation updated values of said mixed-test-statistic each time a new input sample is received to form a cumulant and apply a function to said cumulant to compute an updated decision function each said time, said decision function starting at an initial decision value at said given event time, said decision function detecting a noteworthy change in said corrupted piecewise-constant signal at a time when said decision function exceeds a threshold value, continually update as needed and keep track of a minimum-decision-time at which said cumulant achieves a minimum value and identifying said minimum-decision-time as said event time when said decision function exceeds said threshold value.

4. A method of continuous change detection of a corrupted piecewise-constant signal, said corrupted piecewise-constant signal possessing baseline event levels originating from or attributed to a plurality of known levels, the method comprising:

providing in combination an event level estimation means which gathers a plurality of signal samples of said corrupted piecewise-constant signal starting at a given event time and transforms said plurality of signal samples according to a mapping policy to an identified event level selected from said plurality of known levels, providing in combination a deciding means which continually receives as decider inputs said corrupted piecewise-constant signal and parameter data comprising of at least said identified event level and which will:

sequentially compute a mixed-test-statistic value representing a function of a ratio of a relative likelihood of a function of said parameter data and the relative likelihood of a subset of samples of said corrupted piecewise-constant signal said relative likelihoods associated with any probability density function that employs said identified event level as its mean, continually cumulate according to a mathematical operation said mixed-test-statistic recursively over time to form a cumulant and apply a function to said cumulant to compute a continuously updated decision function, said decision function starting at an initial decision value and said decision function detecting a noteworthy change in said corrupted piecewise-constant signal at a time when said decision function exceeds a threshold value, and resetting the said decision function to said initial decision value after said threshold value is exceeded.

5. A method of continuous change detection and identification of a corrupted piecewise-constant signal, said corrupted piecewise-constant signal possessing baseline event levels originating from or attributed to a plurality of known levels, the method comprising:

initializing a previous-decision value and initializing an extremum-decision value and initializing an oversample value and assigning a time of the first sample of said corrupted piecewise-constant signal to a previous-event-time value, transforming a plurality of samples of said corrupted piecewise-constant signal starting at the said previous-event-time into an identified-event-level from said plurality of known levels according to a mapping policy, calculating a mixed-test-statistic consisting of a comparison of a relative likelihood of a received signal sample of said corrupted piecewise-constant signal to a relative likelihood of a function of said identified-event-level, said relative likelihoods associated with any probability density function that employs said identified-event-level as its mean, calculating a present-decision value by adding said mixed-test-statistic to said previous-decision value and subsequently assigning the value of said present-decision to said previous-decision, when the value of said extremum-decision exceeds the value of said present-decision the value of said present-decision is assigned to said extremum-decision and a time corresponding to said received signal sample is assigned to a new-event-time value, when the value of said present-decision exceeds a threshold value, an event-duration value is calculated as a difference of the value of said new-event-time and the value of said previous-event-time and when said event-duration exceeds said oversample value, valid-event-pair is output, said valid-event-pair comprised of said identified-event-level and said previous-event-time and subsequently said previous-decision value is re-initialized and said extremum-decision value is re-initialized and the value of said new-event-time is assigned to said previous-event-time, repeating the transforming and the calculating steps for every new said received signal sample.

6. A method of continuous detection that identifies event levels and that identifies event times corresponding to said event levels of a corrupted signal, said corrupted signal being a piecewise-constant signal corrupted by at least of noise and distortion, said piecewise-constant signal possessing baseline event levels originating from or being intentionally attributed to a discrete plurality of known levels, the method comprising:

providing in combination a mapping means which gathers a plurality of samples of said corrupted signal and transform said plurality of samples according to a mapping policy to a mapped level value selected from said discrete plurality of known levels, which will:

initially select said mapped level using an initial said plurality of samples that start at an initial event time, assign a value of said initial event time to an incumbent event time and assign the value of said mapped level to a valid event level, consequently select, when a mapper prompt signal is asserted, a new said mapped level using said plurality of samples that start at a newly identified event time, providing in combination a deciding means which continually accepts parameter data comprised of at least one of current values and past values of said mapped level and continually and in temporal order accepts input samples of said corrupted signal from said initial event time onwards and which will:

sequentially compute a mixed-test-statistic value consisting of a comparison of a relative likelihood of one or more of said input samples to the relative likelihood of a function of parameter data, said relative likelihoods associated with any probability density function that employs said mapped level as its mean, cumulate said mixed-test-statistic recursively over time according to a mathematical operation to form a cumulant and apply a function to said cumulant to compute a continuously updated decision value, said decision value starting at some initial decision value, assert a detection signal when the said updated decision value exceeds a threshold value, reset said updated decision value to said initial decision value after generation of said detection signal, providing in combination an identification means which will:

calculate a candidate event time according to a time index corresponding to a minimum of said updated decision value when said detection signal is asserted, calculate an incumbent duration time as a difference between said candidate event time and said incumbent event time, compare said incumbent duration time to an oversample value, identify said incumbent event time as a valid event time and assign the value of said mapped level to said valid event level when said incumbent event time exceeds said oversample value and store said valid event level, identify said incumbent event time as said valid event time and identify the most recently stored value of said valid event level as said valid event level when said incumbent event time does not exceed said oversample value, communicate said valid event time as a newly identified event time to said mapping means and assert said mapper prompt signal, assign a value of said candidate event time to said incumbent event time, wherein said valid event level and said valid event time values are output over time and constitute identified approximations of said piecewise-constant signal.

7. A method of continuous detection and event time and event level identification and a correction of a corrupted piecewise-constant signal, said corrupted piecewise-constant signal possessing baseline event levels originating from or attributed to a plurality of known levels, the method comprising:

providing in combination an event level estimation means for selecting an identified event level from said plurality of known levels starting at an incumbent event time, a value of said identified event level being closest to a measure calculated from a plurality of samples of said corrupted piecewise signal starting at said incumbent event time, providing in combination a means of event detection and event time identification of a candidate event of said corrupted piecewise signal, said candidate event immediately following an incumbent event in said corrupted piecewise-constant signal, the event level of said incumbent event being estimated by said identified event level, providing in combination an error correction means for identifying incumbent events with event duration times of insufficient length and ascribing to such said incumbent events said identified event levels from previous events, said previous events being of sufficient said event duration time.

8. The method of claim 7, wherein said event detection means employs a decision method for detecting both positive and negative deviations away from an in-control level of said corrupted piecewise-constant signal, comprising:

a mixed-test-statistic comprised of a function of a ratio of an out-of-control component to an in-control component, said in-control component comprised of a relative likelihood of a function of at least one sample of said corrupted piecewise-constant signal, said relative likelihood associated with a probability density function with mean comprised of said identified event level, said probability density function being possessed of opposite-sign slope around its mean, said out-of-control component comprised of another relative likelihood of a function of at least said identified event level, said another relative likelihood associated with a probability density function with mean comprised of said identified event level.

9. An apparatus for continuous detection and identification of signal samples of a corrupted piecewise-constant signal, said corrupted piecewise-constant signal possessing baseline event levels originating from or attributed to a plurality of known levels, the apparatus comprising:

at least one buffer circuit for storing input samples of said corrupted piecewise-constant signal as received, at least one mapper circuit for selecting an identified event level from said plurality of known levels using a plurality of stored samples in said buffer and a mapping policy, at least one decider circuit receiving samples of said corrupted piecewise-constant signal and said identified event level from said mapper circuit for asserting a detection signal indicative at a detection time of a candidate event and for asserting an event signal at an event time of said candidate event, at least one shaper circuit receiving said detection signal and said event signal from said decider circuit and said identified event level from said mapper circuit for computation of a corresponding event duration of said identified event level, at least one reshaper circuit receiving said identified event duration from said shaper circuit and said corresponding event duration from said mapper circuit, the at least one reshaper circuit comprising:

computational means for determining when said identified event duration exceeds a minimum event duration, marking said identified event as a valid identified event level and outputting said valid identified event level for a time equal to said identified event duration, other-wise outputting last valid identified event level for a time equal to said identified event duration.

10. The apparatus of claim 9, wherein said mapper circuit and said decider circuit, comprise of:

an even branch apparatus receiving samples from a selected location of said buffer corresponding to an incumbent event or from a selected location of said buffer corresponding to a candidate event, an odd branch apparatus receiving samples from a selected location of said buffer corresponding to an incumbent event if said even branch apparatus is receiving samples from a selected location of said buffer corresponding to a candidate event, otherwise said odd branch apparatus receiving samples from a selected location of said buffer corresponding to a candidate event when said even branch apparatus is receiving samples from a selected location of said buffer corresponding to an incumbent event, said even branch and said odd branch continuously and contemporaneously used for calculating said identified event level and to assert said detection signal and said event signal as appropriate for either an incumbent event or candidate event, wherein said identified event level for a newly detected event may be computed with minimal delay following the assertion of said detection signal corresponding said newly detected event.

* * * * *